US006954224B1

(12) United States Patent
Okada et al.

(10) Patent No.: US 6,954,224 B1
(45) Date of Patent: Oct. 11, 2005

(54) CAMERA CONTROL APPARATUS AND METHOD

(75) Inventors: Susumu Okada, Tokyo (JP); Eimei Nanma, Tokyo (JP); Shinji Nojima, Tokyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/550,038

(22) Filed: Apr. 14, 2000

(30) Foreign Application Priority Data

Apr. 16, 1999 (JP) ................................ 11-109341

(51) Int. Cl.[7] .......................... H04N 7/18; H04N 9/47; H04N 5/225; H04N 5/232

(52) U.S. Cl. ..................... 348/159; 348/169; 348/143; 348/211.99; 348/211.11

(58) Field of Search ....................... 348/207.1–207.11, 348/211.1–211.99, 139, 141–143, 153–159, 348/169, 14.01–14.16; 455/3.03, 3.05–3.06

(56) References Cited

U.S. PATENT DOCUMENTS 4,992,866 A * 2/1991 Morgan ...................... 348/159
5,583,565 A * 12/1996 Cortjens et al. ........... 348/14.1
6,359,647 B1 * 3/2002 Sengupta et al. ........... 348/154
6,597,389 B2 * 7/2003 Tanaka et al. ........... 348/14.08
2002/0067412 A1 * 6/2002 Kawai et al. ............... 348/211

FOREIGN PATENT DOCUMENTS

| | | | |
|---|---|---|---|
| EP | 0 529 317 | A1 | 3/1993 |
| EP | 0 715 453 | A2 | 6/1996 |
| EP | 0 723 374 | A1 | 7/1996 |
| EP | 0 729 275 | A2 | 8/1996 |
| WO | WO 97/37494 | | 10/1997 |

OTHER PUBLICATIONS

Patent Abstracts of Japan, Ito Miki, "Controller for Video Conference System and Image Input Device", Publication No. 07123390, Publication Date: May 12, 1995, 1 page.

* cited by examiner

*Primary Examiner*—Wendy R. Garber
*Assistant Examiner*—Kelly L. Jerabek
(74) *Attorney, Agent, or Firm*—Pearne & Gordon LLP

(57) ABSTRACT

A camera control apparatus and method, in that angles required for cameras to train on a position designated by an operator, are calculated from the designated position and directions in which the cameras are currently oriented. On the basis of the thus-calculated angles, a camera requiring the minimum angle from among the plurality of cameras is determined as the camera capable of being trained on the designated position most quickly.

18 Claims, 28 Drawing Sheets

CAMERA CONTROL APPARATUS AND METHOD

BACKGROUND OF THE INVENTION

The present invention relates to an image-receiver (e.g., a camera control system capable of controlling a camera angle) of a system comprising an image-transmitter for transmitting camera images captured by a plurality of cameras whose angles can be controlled, and the image-receiver for displaying the thus-transmitted camera images.

Recent advances made in network technology has brought out a system which transmits over a network an image captured by a camera and plays back the image at the receiving end (hereinafter often called an "image-receiving end"). Of such systems, many systems enable the image-receiving end which receives and plays back an image to control a turn table on which is mounted a camera connected to the transmitting end (hereinafter often called an "image-transmitting end").

Japanese Patent Unexamined Publication 7-123390/(1995) describes a camera control system which enables an image-receiving end to control a camera connected to an image-transmitting end. The image-receiving end is equipped with a monitor screen having a plurality of windows for indicating a plurality of camera images (also called "camera image windows"), a camera selection button, and a camera control panel. By pressing the camera selection button while viewing images on the camera image windows, an operator selects a camera which he desires to control. The operator then presses a control button provided in the camera control panel, to thereby transmit a control command to the image-transmitting end and enable control of operation of the camera connected to the image-transmitting end.

The operation of the camera control system will now be described briefly by reference to FIG. 27.

The camera control system comprises cameras 2701 for capturing images; image transmitters 2710 for transmitting the images captured by the cameras 2701; an image receiver 2720; a display 2704 for displaying images; and an input device 2705 for entering a command which enables the image receiver 2720 to control the camera 2701 connected to the selected image transmitter 2710.

Each of the image transmitters 2710 comprises an image data import section 2711 for importing an image captured by the corresponding camera 2701; an image data transmission section 2712 for transmitting image data to the image receiver 2720; a control command receiving section 2713 for receiving a camera control command transmitted from the image receiver 2720; and a control command transmission section 2714 for transmitting the camera control command to the camera 2701.

The video receiver 2720 comprises an image data receiving section 2721 for receiving a plurality of images transmitted from the image transmitters 2710; an, image data playback section 2722 for displaying the plurality of image data sets on the display 2704; a command load section 2723 for loading a camera control command entered by way of the input device 2705; and a control command transmission section 2724 for transmitting, to the image transmitters 2710, the camera control command loaded by way of the command load section 2723.

Next will be described the flow of operation from when each of the cameras 2701 captures an image until the display 2704 displays the thus-captured images.

The image captured by the camera 2701 is imported into the image data import section 2711, and the image data import section 2711 delivers to the image data transmission section 2712 data pertaining to the thus-imported image. The image data transmission section 2712 transmits the image data to the image data receiving section 2721 of the image receiver 2720. The image data receiving section 2721 receives a plurality of image data sets from the plurality of image data transmission sections 2712 and delivers the thus-received image data sets the image data playback section 2722. The image data playback section 2722 displays a plurality of images on the display 2704.

There will be now described the flow of operation through which the image receiver 2720 controls the cameras 2701 connected to the plurality of image transmitters 2710. FIG. 28 shows an example camera control panel for controlling the cameras 2701 and example images captured thereby to be displayed on the display 2705. A display screen 2800 comprises image display areas 2801, 2802 and 2803 for displaying images captured by the plurality of cameras 2701; a camera control panel display area 2801; and a control camera selection display area 2830. The camera control panel display area 2810 comprises an UP button 2811, a DOWN button 2812, a LEFT button 2813, and a RIGHT button 2814 for panning the camera 2701 vertically or hoizontally; an IN button 2817 and an OUT button 2818 for causing the camera 2701 to zoom in and out; and a focusing button 2819 and defocusing button 2820. The control camera selection button 2830 comprises camera selection buttons 2831, 2832 and 2833.

By way of the input device 2705 shown in FIG. 27, the operator selects a camera he desires to control, by means of pressing any one of the camera selection buttons 2831, 2832, and 2833 and pressing any of the buttons 2811 through 2820. The command load section 2723 loads a control command assigned to the camera selected by means of the camera selection button and delivers the thus-loaded control command to the control command transmission section 2724. The control command transmission section 2724 transmits the control command to the control command receiving section 2713 of the image transmitter 2710 corresponding to the camera selection button selected from the camera selection buttons 2831, 2832, and 2833. Upon receipt of the control command, the control command receiving section 2713 delivers the thus-received control command to the corresponding control command transmission section 2714. The control command transmission section 2714 delivers the control command to the corresponding camera 2701, whereupon the camera 2701 performs the operation instructed by way of the input device 2705.

The camera control system of background art encounters the following drawbacks:

1) In a case where the camera control system is equipped with a plurality of cameras, the operator must designate a camera to be controlled. Even after designation of a camera, there may be a chance of another camera being able to capture a desired image with rotation less than that which would be required by the designated camera. Selection of a camera capable of capturing a desired scene most quickly is left to the operator's judgment. However, in many cases, optimal judgement is not rendered by the operator.

2) Even in a case where the operator designates and controls a camera, an impediment may block the camera from capturing a desired image.

3) Even in a case where the operator designates and controls a camera, another camera may be able to more quickly attain focus on a desired location through rotation than can the designated camera. The operator is uncertain of which camera that can shoot a desired location in the least amount of time.

4) Even in a case where the operator designates and controls a camera, to thereby train the camera on a desired location, the user is uncertain as to whether or not the location is viewable from the direction from which the operator desires to shoot.

5) Even in a case where the operator designates and controls a camera, another camera may be able to more quickly zoom in a desired range through rotation than can the designated camera. The operator is uncertain of which camera can zoom into a desired range in the least amount of time.

6) In a case where the operator designates and controls a camera, even if an image captured by a camera under control is subjected to rotation, the operator encounters difficulty in ascertaining the image which is currently being controlled, since all the images captured by the cameras are in motion.

7) When desiring to view details of a certain location and its surroundings simultaneously, the operator must control two or more cameras independently through use of control commands, thus consuming time.

SUMMARY OF THE INVENTION

The present invention is aimed at controlling a camera capable of capturing most quickly an image situated at a desired location in a case where the camera control system is equipped with a plurality of cameras and where one or more of the cameras are controlled.

To solve the problems, in the present invention, angles required for cameras to train on a position designated by an operator, are calculated from the designated position and directions in which the cameras are currently oriented. On the basis of the thus-calculated angles, a camera requiring the minimum angle from among the plurality of cameras is determined as the camera capable of being trained on the designated position most quickly.

As a result, a camera capable of being trained toward the designated direction can be selected from the plurality of cameras. The user can operate the thus-selected camera without a necessity of pressing any one of UP, DOWN, LEFT, and RIGHT buttons. Thus, the present invention yields an advantage of shortening the time from when the operator desires to view a screen until a scene captured by a camera is displayed.

Of a plurality of cameras, a camera which is hindered by an impediment from capturing a position designated by the operator is not considered a candidate camera-to-be-operated.

The present invention yields an advantage of preventing occurrence of a case where an impediment blocks a camera selected and controlled by the operator from capturing a desired scene.

Two factors; that is, an angle through which the camera must pan until it is trained on the designated location, and focusing a camera on the designated location, are converted into factors which can be compared across cameras; that is, a time required for the camera to pan, and a time required for the camera to achieve focusing. The camera to be controlled is selected on the basis of these factors.

As a result, there are examined a time required for the camera to pan toward the designated location and a time required for the camera to attain focusing on the designated location. With regard to these two factors, the cameras are compared with each other, thereby enabling selection of the camera which can most quickly be trained on the designated location and achieve focusing on the designated position.

The operator instructs a desired location and the direction of the desired location. From among cameras which cover the desired direction, there is selected the camera which can be trained on the designated location most quickly.

As a result, cameras which can capture an image at the designated location in the desired direction can be automatically selected. From among the thus-selected cameras, a camera which can most quickly be trained on the designated location can be automatically selected.

A camera is selected on the basis of the time required from when a range which covers the designated location and is instructed directly by the operator is loaded into a camera until the camera is panned to the designated location, as well as on the basis of the time required until an image of the instructed range captured by the camera is displayed.

As a result, the user enables a camera to capture an image by designation of a desired range.

An image captured by a camera which is in operation is displayed in an enlarged manner. As a result, the operator can ascertain which camera is in operation. Further, by means of specifying and enlarging an image, the operator can monitor the image at the designated location in detail while viewing a screen.

Two or more cameras which can be quickly trained on the designated location are controlled in decreasing sequence of quickness, thus simultaneously shooting an image situated at a single designated location. Combination of a plurality of cameras enable the operator to simultaneously grasp a detailed image about the designated location and the situation of the surroundings of the designated location. Further, a plurality of cameras can be operated by means of entry of a single command.

Accordingly, the present invention provides a camera control apparatus comprising: an image data receiving section for receiving from an image transmitter image data captured by cameras; an image data playback section for display, on a screen, the received images; a camera control area display section for displaying camera symbols, which correspond to information representing the locations of the cameras, and the directions in which the cameras are oriented, as a control region for controlling the cameras connected to the image transmitter; a command load section for loading the coordinates of a location in the control region designated by an operator; a camera-to-be-operated determination section for determining a camera optimal for shooting the designated location; a control command conversion section for converting information about the coordinates loaded by the command load section, into a control command signal capable of being used for controlling the cameras; and a control command transmission section for transmitting the converted control command signal to the image transmitter. The positions of the cameras and the shooting directions thereof are displayed in the camera control region. The operator specifies a location—which the operator desires to shoot—in the area where the positions and shooting directions of the cameras are displayed, through use of a mouse. From among the plurality of cameras, the camera optimal for shooting the designated location is selected.

The operator can operate the camera without involvement of actual operation of UP, DOWN, RIGHT, and LEFT buttons. In contrast with a system in which a camera is operated through use of the UP, DOWN, RIGHT, and LEFT buttons, the apparatus of the present invention eliminates superfluous operations, thereby shortening the time from when the operator decides to monitor a certain scene until the scene captured by the camera appears on the display.

Further, the present invention provides a camera control method comprises steps of: displaying images captured by a plurality of cameras, a map relating to a location whose image is captured by the plurality of cameras, camera symbols representing the locations of the cameras in the map, and the directions in which the cameras are oriented; selecting a camera optimal for shooting a location designated by an operator, and controlling the selected camera such that the camera is panned toward the designated location. The positions of the cameras and the shooting directions thereof are displayed in the camera control region. The operator specifies a location—which the operator desires to shoot—in the area where the positions and shooting directions of the cameras are displayed, through use of a mouse. From among the plurality of cameras, the camera optimal for shooting the designated location is selected.

The operator can operate the camera without involvement of actual operation of UP, DOWN, RIGHT, and LEFT buttons. In contrast with a system in which a camera is operated through use of the UP, DOWN, RIGHT, and LEFT buttons, the system of the present invention eliminates superfluous operations, thereby shortening the time from when the operator decides to monitor a certain scene until the scene captured by the camera appears on the display.

Preferably, the camera-to-be-operated determination section determines a camera to be panned, on the basis of an angle between an imaginary line connecting the center of the camera symbol with the designated location and the direction in which the cameras is currently oriented. The positions of the cameras and the shooting directions thereof are displayed in the camera control region. The operator specifies a location—which the operator desires to shoot—in the area where the positions and shooting directions of the cameras are displayed, through use of a mouse. From among the plurality of cameras, the camera optimal for shooting the designated location is selected.

The operator can operate the camera without involvement of actual operation of UP, DOWN, RIGHT, and LEFT buttons. In contrast with a system in which a camera is operated through use of the UP, DOWN, RIGHT, and LEFT buttons, the system of the present invention eliminates superfluous operations, thereby shortening the time from when the operator decides to monitor a certain scene until the scene captured by the camera appears on the display.

Preferably, from among the plurality of cameras, there is selected a camera involving a minimum angle between the direction in which the camera is currently oriented and the imaginary line connecting the center of the camera symbol with the designated location. The positions of the cameras and the shooting directions thereof are displayed in the camera control region. The operator specifies a location—which the operator desires to shoot—in the area where the positions and shooting directions of the cameras are displayed, through use of a mouse. From among the plurality of cameras, the camera optimal for shooting the designated location is selected.

The operator can operate the camera without involvement of actual operation of UP, DOWN, RIGHT, and LEFT buttons. In contrast with a system in which a camera is operated through use of the UP, DOWN, RIGHT, and LEFT buttons, the system of the present invention eliminates superfluous operations, thereby shortening the time from when the operator decides to monitor a certain scene until the scene captured by the camera appears on the display.

Preferably, the camera control system comprises an employable camera survey section which stores information about the positions of impediments existing in the area to be shot by the plurality of cameras and which eliminates a camera incapable of shooting the designated location from candidates considered by the camera-to-be-operated determination section.

Even if an impediment blocks the view field of a certain camera and hinders the camera from shooting the location designated by the operator, the system can be set so as to avoid selection of that camera, thereby preventing a situation in which an impediment blocks the camera directed toward the designated location.

Preferably, the camera which is blocked by an impediment and cannot shoot the designated location is eliminated from candidates for selection of a camera to be operated.

Even if an impediment blocks the view field of a certain camera and hinders the camera from shooting the location designated by the operator, the system can be set so as to avoid selection of that camera, thereby preventing a situation in which an impediment blocks the camera directed toward the designated location.

Preferably, in the event of presence of an impediment in the area where the cameras are disposed, the impediment is displayed.

The operator can ascertain the location of the impediment from the display.

Preferably, the camera control system further comprises:

an angular-shift-time calculation section for calculating the time required for the camera to pan toward the designated location; a focus storage section for grasping the focus of a plurality of cameras; and a focus-shift-time calculation section for calculating the time required for the camera to attain a focus on the designated location, wherein the camera-to-be-operated determination section determines a camera which can shoot the designated location in the minimum time as a camera to be operated, on the basis of the time required for the camera to pan toward the designated location, as well as the time required for the camera to attain a focus on the designated location.

The focuses of respective cameras have been grasped beforehand. With regard to the respective camera, there are calculated the time required for the camera to pan toward the designated location, as well as the time required for the camera to attain a focus on the designated location. With regard to respective camera, the time required for the camera to pan toward and attain a focus on the designated location is calculated from these time periods. Through comparison between the thus-calculated times, there is selected a camera capable of panning toward and attaining a focus on the designated location most quickly, thus enabling selection of a camera much optimal for shooting.

Preferably, from among the plurality of cameras, a camera which can shoot the designated location within the minimum period of time is selected on the basis of the time required for the camera to pan toward the designated location from the direction in which the camera is currently oriented and the time required for the camera to zoom into the designated location, and the selected camera is panned toward the designated location and attains focus on the designated location.

The focuses of respective cameras have been grasped beforehand. With regard to the respective camera, there are calculated the time required for the camera to pan toward the designated location, as well as the time required for the camera to attain a focus on the designated location. With regard to respective camera, the time required for the camera to pan toward and attain a focus on the designated location is calculated from these time periods. Through comparison between the thus-calculated times, there is selected a camera capable of panning toward and attaining a focus on the designated location most quickly, thus enabling selection of a camera much optimal for shooting.

Preferably, there are displayed not only the direction in which the camera is oriented but also the focusing state of the camera.

The operator can ascertain the location on which the camera is currently being focused.

Preferably, the camera control system comprises: a view-point direction survey section for storing the direction in which the operator desires to shoot the designated location, wherein the camera-to-be-operated determination section determines a camera to be operated, from information as to whether or not an image can be shot in the direction designated by the view-point survey section, as well as from the angle between the current shooting direction of the camera and the direction of an imaginary line connecting the designated location with the center of the camera symbol.

Cameras capable of shooting an image of the designated location from a desired location can be automatically selected, and a camera capable of being panned most quickly to the desired direction and location can be automatically selected from among those cameras.

Preferably, cameras incapable of shooting an image from a direction desired by the operator are eliminated from candidates camera-to-be-operated.

Cameras capable of shooting an image of the designated location from a desired location can be automatically selected, and a camera capable of being panned most quickly to the desired direction and location can be automatically selected from among those cameras.

Preferably, there is displayed information about the direction in which the operator desires to shoot.

The operator can ascertain the direction in which the operator views the designated location, from the display.

Preferably, the camera control system comprises: an angular-shift-time calculation section for calculating the time required for the camera to pan toward the designated location; a zoom storage section for grasping the degree of zoom of a plurality of cameras; a zoom-shift time calculation section for calculating the time required for a camera to zoom in order to display an image of the designated range; and a zoom range display section for displaying, in the camera control region, a range to be zoomed, wherein the camera-to-be-operated determination section determines a camera to be operated, from the time required for the camera to pan toward the designated location after the operator has designated a desired range in the control region and the time required for the camera to zoom in or out for attaining focus on the designated range.

In a case where the operator designates a desired range rather than a desired location, a camera optimal for shooting the designated range can be automatically selected by means of calculating the time required for a camera to pan toward a designated direction from information about the current shooting direction of the camera; calculating the time required for the camera to zoom into the designated range from information about the distance from the currently zoomed location to the designated range; and comparing the cameras in terms of the thus-calculated times, to thereby select the camera capable of most quickly panning toward the designated direction and zooming into the designated range.

Preferably, from among the plurality of cameras, there is selected a camera which can shoot the designated range within the minimum period of time, on the basis of the time required for the camera to pan toward a designated range from the direction in which the camera is currently oriented after the camera has received an instruction for designating a desired range from the operator, and the time required for the camera to attain focus on the designated range from the range on which the camera is currently focused, and the selected camera is panned toward the designated location, to thereby attain focus on the designated range.

In a case where the operator designates a desired range rather than a desired location, a camera optimal for shooting the designated range can be automatically selected by means of calculating the time required for a camera to pan toward a designated direction from information about the current shooting direction of the camera; calculating the time required for the camera to zoom into the designated range from information about the distance from the currently zoomed location to the designated range; and comparing the cameras in terms of the thus-calculated times, to thereby select the camera capable of most quickly panning toward the designated direction and zooming into the designated range.

Preferably, an image captured by the camera selected by the camera-to-be-operated determination section is displayed greater than images captured by other cameras.

Among the images captured by a plurality of cameras, the image of the camera selected by the camera-to-be-operated determination section is enlarged, and the images of the other cameras which are not to be operated are scaled down. As a result, the operator can readily ascertain the camera which is currently in an operating state and can view an enlarged image of the designated location in detail.

Preferably, when a camera most optimal for shooting the designated location is selected, an image captured by the thus-selected camera is displayed greater than images captured by other cameras.

Among the images captured by a plurality of cameras, the image of the camera selected by the camera-to-be-operated determination section is enlarged, and the images of the other cameras which are not to be operated are scaled down. As a result, the operator can readily ascertain the camera which is currently in an operating state and can view an enlarged image of the designated location in detail.

Preferably, the camera control system comprises:

- a zoom-scale determination section for determining the zoom scale of each of the cameras which have been examined as being optimal for shooting the designated location by the camera-to-be-operated determination section, in sequence in which the cameras are arranged.

Images of the desired location are captured simultaneously through use of two or more cameras. The combined use of cameras enables the operator to simultaneously obtain a detailed image of the designated location and grasp the condition of surroundings of the designated location. Thus, the present invention enables operation of a plurality of cameras through entry of a single command, thus realizing more-effective shooting of an image while involving less operation.

Preferably, when cameras optimal for shooting the designated location are selected, images captured by the cameras are displayed at respective scales, in sequence in which the cameras are arranged.

Images of the desired location are captured simultaneously through use of two or more cameras. The combined use of cameras enables the operator to simultaneously obtain a detailed image of the designated location and grasp the condition of surroundings of the designated location. Thus, the present invention enables operation of a plurality of cameras through entry of a single command, thus realizing more-effective shooting of an image while involving less operation.

DETAILED DESCRIPTION OF THE PREFERRED EMBODIMENTS

Preferred examples of the present invention will be described hereinbelow by reference to FIGS. 1 through 26. The present invention is not limited to the examples and is susceptible to various modifications within the scope of the invention.

First Embodiment

The present example is directed to a system comprising an image transmitter for transmitting images captured by a plurality of cameras; and an image receiver which receives the images over a network and display those camera images. The system enables the image receiver to control angles of the cameras connected to the image transmitter.

Figure 1:
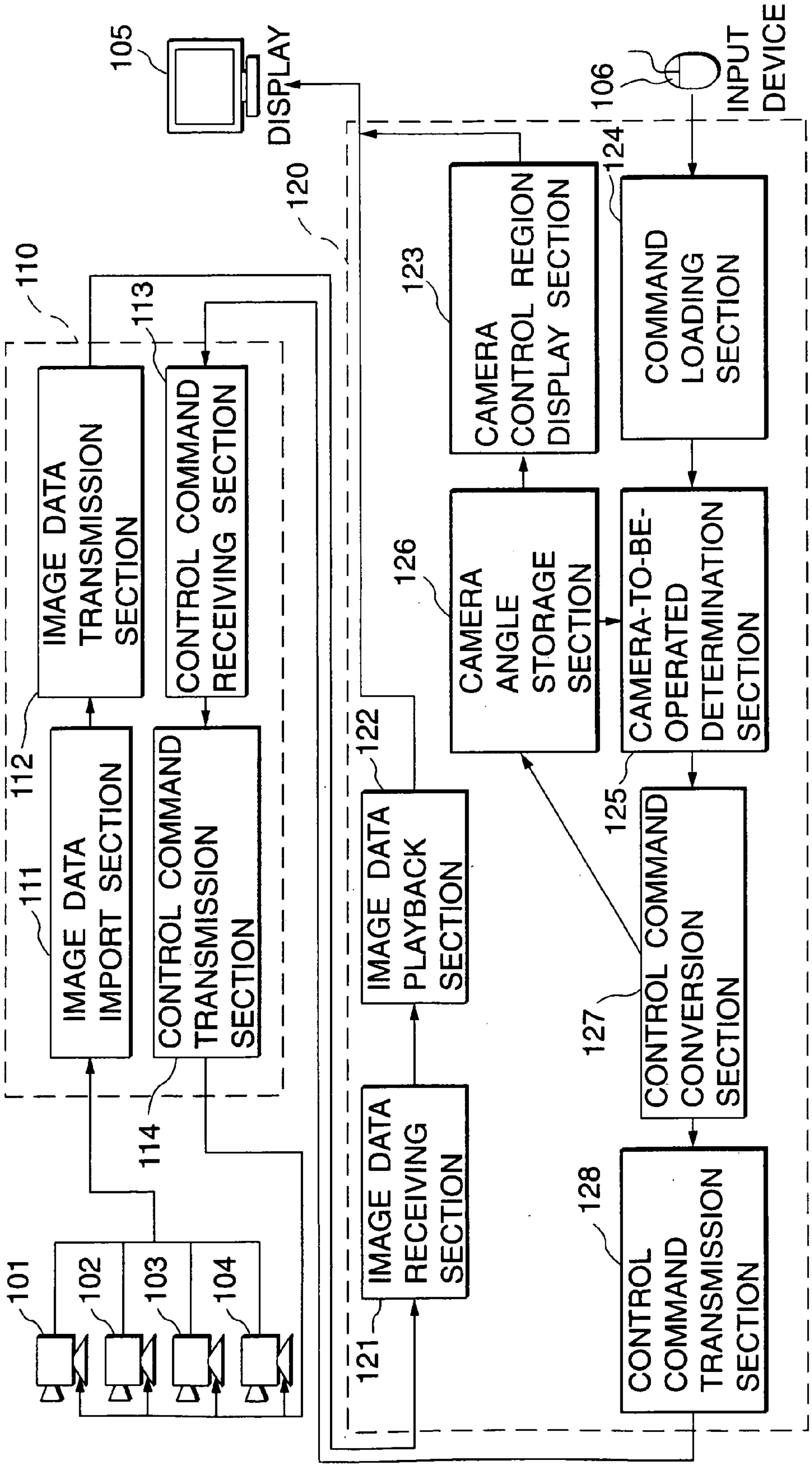
FIG. 1 is a block diagram showing the configuration of a camera control system according to first emobdiment of the present invention.
Figure 2:
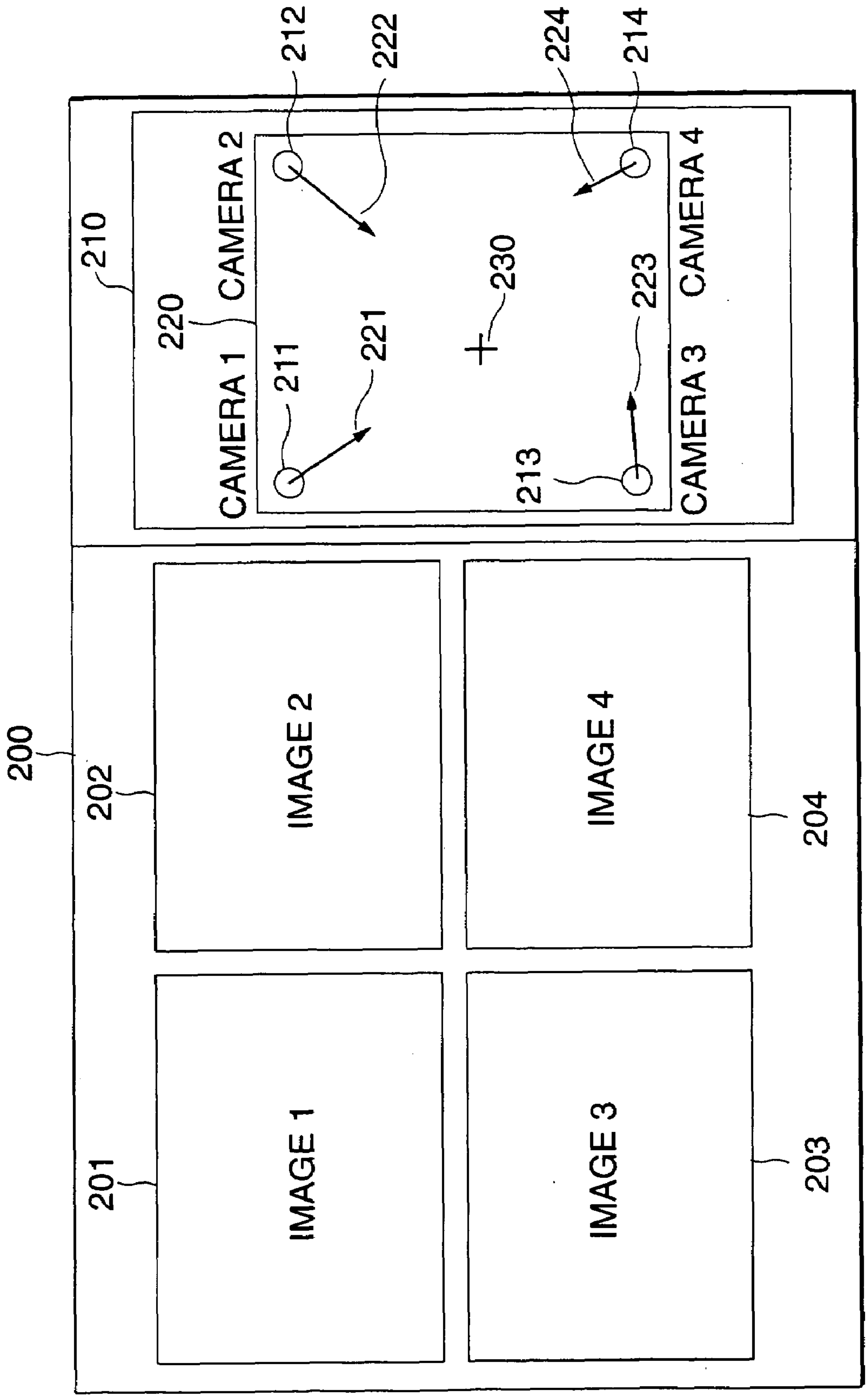
FIG. 2 is a schematic representation showing the layout of a display screen displayed on an image receiver according to first embodiment.

There will now be described a camera control method, under which, when an operator instructs a location which he desires to monitor (hereinafter called a "designated location"), by way of an input device connected to the image receiver, a camera capable of panning to and shooting the designated location most quickly is automatically selected from among the plurality of cameras, and the thus-selected camera is panned to the designated location. FIG. 1 shows the configuration of the system which embodies the camera control method. Further, FIG. 2 shows an example layout of a display screen connected to the image receiver in a case where cameras are controlled according to the camera control method of the present invention.

In FIG. 1, reference numerals 101, 102, 103, and 104 designate cameras; 110 designates an image transmitter for transmitting images; 120 designates an image receiver for receiving images; 105 designates a display for displaying the images received by the image receiver 120; and 106 designates an input device connected to the image receiver 120 capable of controlling the cameras 101, 102, 103, and 104. In FIG. 2, reference numeral 200 designates a screen of the display 105 connected to the image receiver 120; 201 designates an image display area for displaying the image captured by the camera 101; 202 designates an image display area for display an image captured by the camera 102; 203 designates an image display area for displaying the image captured by the camera 103; 204 designates an image display area captured by the camera 104; 210 designates a camera control area for controlling the cameras 101, 102, 103, and 104 connected to the image transmitter 110; 211 designates a camera symbol depicting the position of the camera 101 and the shooting direction thereof; 212 designates a camera symbol depicting the position of the camera 102 and the shooting direction thereof; 213 designates a camera symbol depicting the position of the camera 103 and the shooting direction thereof; 214 designates a camera symbol depicting the position of the camera 104 and the shooting direction thereof; 220 designates a map showing a region in which the cameras 101, 102, 103, and 104 are performing shooting operation; and 230 designates a pointer which enables the operator to instruct a desired location on the map 220.

The image transmitter 110 shown in FIG. 1 comprises an image import section 111 for importing images captured by the cameras 101, 102, 103, and 104; an image data transmission section 112 for transmitting to the image receiver 120 data corresponding to the thus-imported image data; a control command receiving section 113 for receiving a camera control request from the image receiver 120; and a control command transmission section 114 for delivering, to the cameras 101 through 104, the camera control request (hereinafter also called a "camera control command") received by the control command receiving section 113.

The image receiver 120 shown in FIG. 1 comprises an image data receiving section 121 for receiving the image data transmitted from the image transmitter 110; an image data playback section 122 for displaying the thus-received images on the screen 200; a cameral control area display section 123; a command load section 124 for loading coordinates of a location which the operator desires to monitor and designates through use of the input device 106; a camera-to-be-operated determination section 125; a camera angle storage section 126 for storing the angles of the respective cameras 101, 102, 103, and 104; a control command conversion section 127 for converting the coordinate information loaded by way of the command loading section 124 into a signal (a control command) which enables control of the cameras 101 through 104; and a control command transmission section 128 for transmitting the thus-converted command to the image transmitter 110. The camera control area display section 123 displays, on the display 105, the camera symbols 211 through 214 included in the camera control area 210 shown in FIG. 2, and the shooting directions 221 through 224 of the cameras 101 through 104. The camera-to-be-operated determination section 125 determines an angle between the shooting direction 221 of the camera 101 and an imaginary extension extending from the center of the camera symbol 211 to the location designated by the pointer 230; an angle between the shooting direction 222 of the camera 102 and an imaginary extension extending from the center of the camera symbol 212 to the location designated by the pointer 230; an angle between the shooting direction 223 of the camera 103 and an imaginary extension extending from the center of the camera symbol 213 to the location designated the pointer 230; and an angle between the shooting direction 224 of the camera 104 and an imaginary extension extending from the center of the camera symbol 214 to the location designated by the pointer 230. The camera assigned the camera symbol having the smallest angle is determined as the camera to be panned.

There will now be described the flow of operation from when the image transmitter 110 imports the images captured by the cameras 101 through 104 until the image receiver 120 plays back those images on the display 105.

In the image transmitter 110, the image data import section 111 imports data sets pertaining to the images captured by the cameras 101 through 104, and these image data sets are transmitted in a bundle to the image data transmission section 112. The image data transmission section 112 receives the plurality of images imported by the image data import section 11 and transmits the thus-received image data sets to the image receiver 120. The image data receiving section 121 receives the thus-transmitted image data sets. The image data playback section 122 determines display areas on the screen 200 and displays, on the display 105, the plurality of image data sets received by the image data receiving section 121 in the display areas assigned to the respective image data sets. The display areas may have been determined in advance or may have been determined by the user. The camera control area display section 123 displays, on the display 105, the camera symbols 211 through 214 representing respective locations of the cameras 101 through 104, and the shooting directions 221 through 224 of the cameras 101 through 104.

Next will be described the flow of control of the cameras 101 through 104 connected to the image transmitter 110, attained by entry of a camera control command through use of the input device 106 connected to the image receiver 120.

Figure 3:
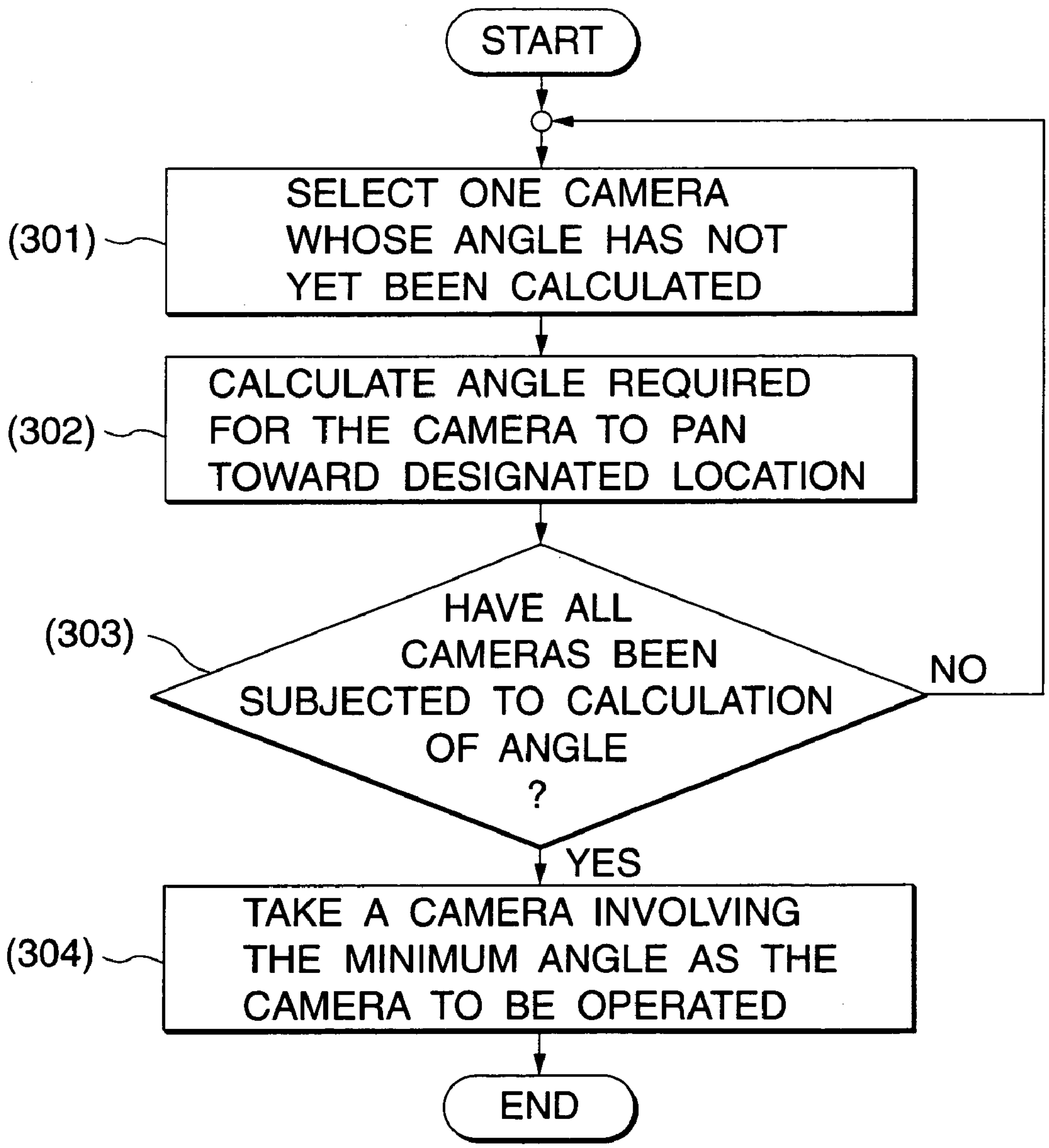
FIG. 3 is a flowchart showing processing required for determining which of cameras is to be operated according to first embodiment.
Figure 4:
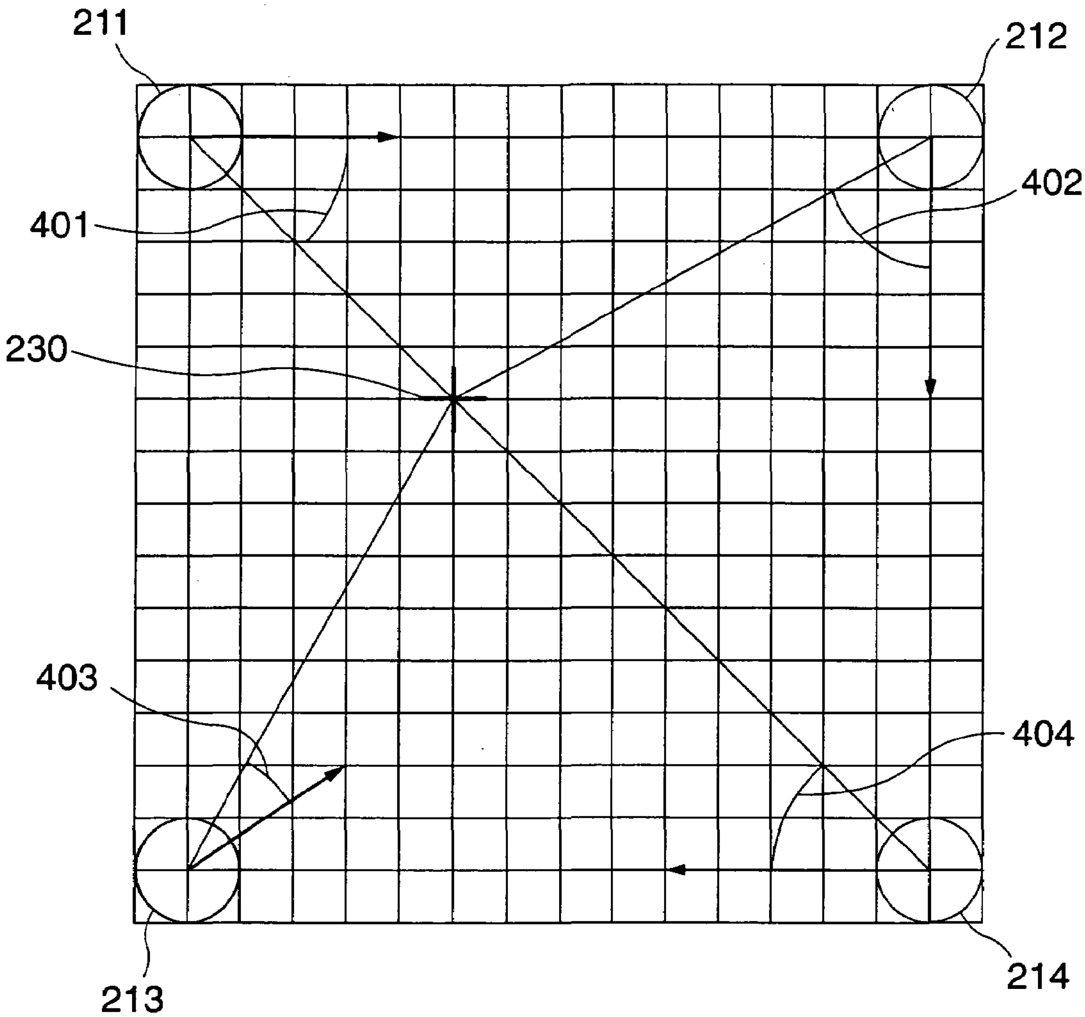
FIG. 4 is a schematic representation illustrating an example camera control region according to first embodiment.

When the operator selects one point on the map 220 by means of operating the pointer 230 shown in FIG. 2 through use of the input device 106, such as a mouse, the command load section 124 recognizes the coordinates of the location, to thereby produce coordinate information. The coordinate information is then delivered to the camera-to-be-operated determination section 125. FIG. 3 is a flowchart showing processing required for the camera-to-be-operated determination section 125 to determine which of the cameras 101 through 104 connected to the image transmitter 110 is to be operated. FIG. 4 schematically illustrates the location designated by the operator through use of the pointer 230 and the x-y coordinates of positions of the camera symbols 211 through 214. The flow of determination of the camera to be operated will now be described by reference to FIGS. 3 and 4.

Figure 5:
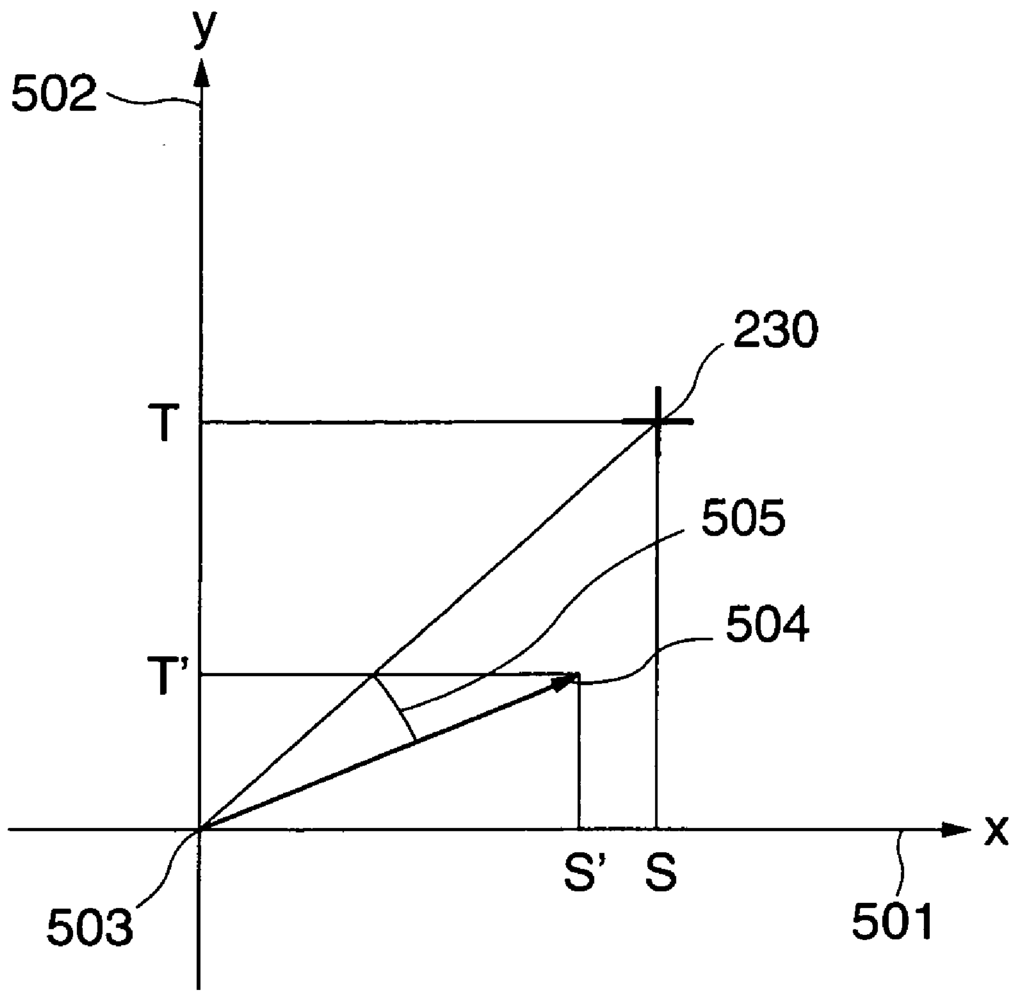
FIG. 5 is a plot showing an example calculation of an angle according to first embodiment.

The camera-to-be-operated determination section 125 selects, from among the plurality of cameras 101 through 104, a camera for which there has not yet been examined an angle through which the camera must be panned such that the designated location falls on the center of a frame (step 301). In the example shown in FIG. 4, the camera 101 designated by the camera symbol 211 is selected. The camera-to-be-operated determination section 125 then determines an angle 401 between the shooting direction of the camera 101—which is obtained at the time when the operator has designated the location and is stored in the camera angle storage section 126—and an imaginary line extending from the camera 101 to the designated location loaded by the command load section 124 (step 302). FIG. 5 depicts determination of an angle which is to be measured for determining the camera to be operated. The illustration shows the location designated by the operator through use of the pointer 230, an x-axis 501, a y-axis 502, the point of origin 503 serving as the center of the camera symbols, the direction 504 in which the camera is currently performing a shooting operation, and an angle 505 between the shooting direction 504 and the line extending from the point 230 to the point of origin 503.

In FIG. 5, there is calculated an angle through which the camera is to pan from the current shooting direction to the location designated by the pointer 230. As an example, the angle 505 is calculated from the coordinates (S,T) of the designated location, as well as from the shooting direction (S', T') of the camera.

$$\theta=\tan^{-1}(T/S)-\tan^{-1}(T'/S') \quad (1)$$

Another method may also be employed for calculating an angle. In the example shown in FIG. 4, the angle 401 relating to the camera symbol 211 is calculated to be 45°. The angle 402 relating to the camera symbol 212, the angle 403 relating to the camera symbol 213, and the angle 404 relating to the camera symbol 214 are also calculated in the same manner (step 303).

Provided that the angle 402 is 60°, the angle 403 is 30°, and the angle 404 is 45°, the camera-to-be-operated determination section 125 determines the minimum camera angle from the thus-calculated angles 401, 402, 403, and 404. The camera corresponding to the camera symbol assigned the thus-determined minimum angle is taken as the camera to be used for shooting the designated location (step 304). In this example, the minimum angle is the angle 403, and hence the camera 103 corresponding to the camera symbol 213 is taken as the camera to be operated. The camera-to-be-operated determination section 125 sends, to the control command conversion section 127, information (also called "angle information") about the camera to be operated and the angle through which the camera is to be panned. The control command conversion section 127 converts the angle information received from the camera-to-be-operated determination section 125 into a command for panning the camera toward the designated location loaded by way of the command load section 124.

In this example, the angle is specified by use of a numerical value, and the camera is panned through the designated angle through use of a turn table. In a case where angular information is transmitted and the turn table is rotated according to a different scheme, the command conversion section 127 converts the angular information into a command which enables rotation of the turn table. Information about the angle of the camera after the camera has been panned according to the command is transmitted to the camera angle storage section 126. The camera angle storage section 126 transmits, to the camera control area display section 123, the angle of the camera after the camera has been panned. The control command transmission section 128 transmits over the network, to the video transmitter 110, the command converted by the control command conversion section 127.

The present invention has described the example in which the area where the plurality of cameras are disposed is viewed in the direction perpendicular to the ground. However, depending on the correlation between the cameras, the area of the cameras may be viewed in various directions, such as a vertical, parallel, or oblique direction. For example, in a case where cameras overlap when viewed in the direction perpendicular to the ground, the operator can select a camera capable of shooting the designated location most quickly, so long as the area of cameras is viewed from a direction parallel to the ground or oblique relative to the ground.

As mentioned above, in the present example, the camera control area display section 123 displays, in the camera control region 210 and on the map 220, the positions of the cameras and the shooting directions thereof. The operator specifies a location—which the operator desires to shoot—in the map 220 through use of a mouse. The camera-to-be-operated determination section 125 selects, from among the plurality of cameras, the camera optimal for shooting the designated location.

Consequently, the operator can operate the camera without involvement of actual operation of UP, DOWN, RIGHT, and LEFT buttons. In contrast with a system in which a camera is operated through use of the UP, DOWN, RIGHT, and LEFT buttons, the system of the present example eliminates superfluous operations, thereby shortening the time from when the operator decides to monitor a certain scene until the scene captured by the camera appears on the display. Thus, the present invention yields a great practical effect.

Second Embodiment

Figure 6:
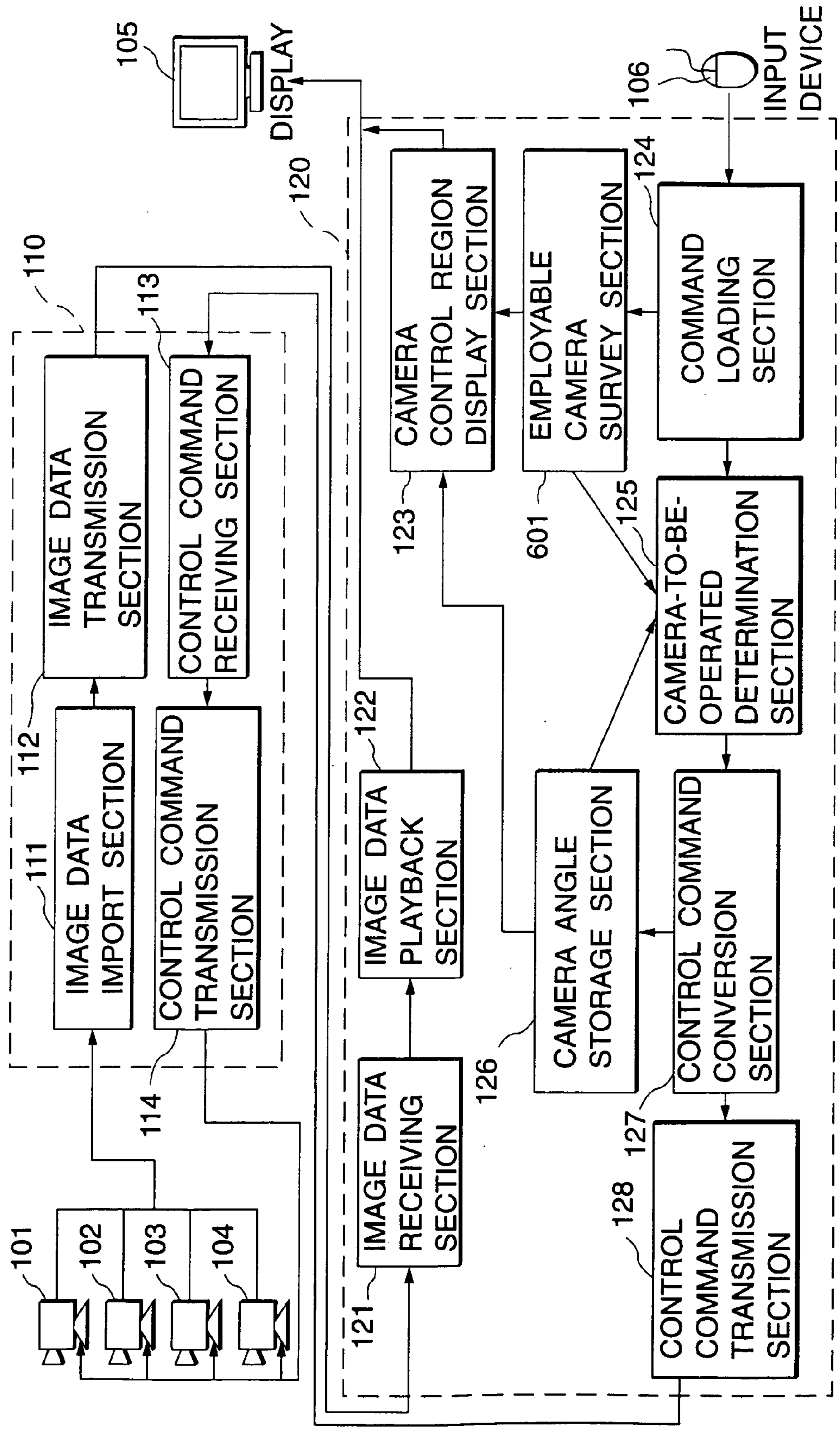
FIG. 6 is a block diagram showing the configuration of a camera control system according to second embodiment of the present invention.
Figure 7:
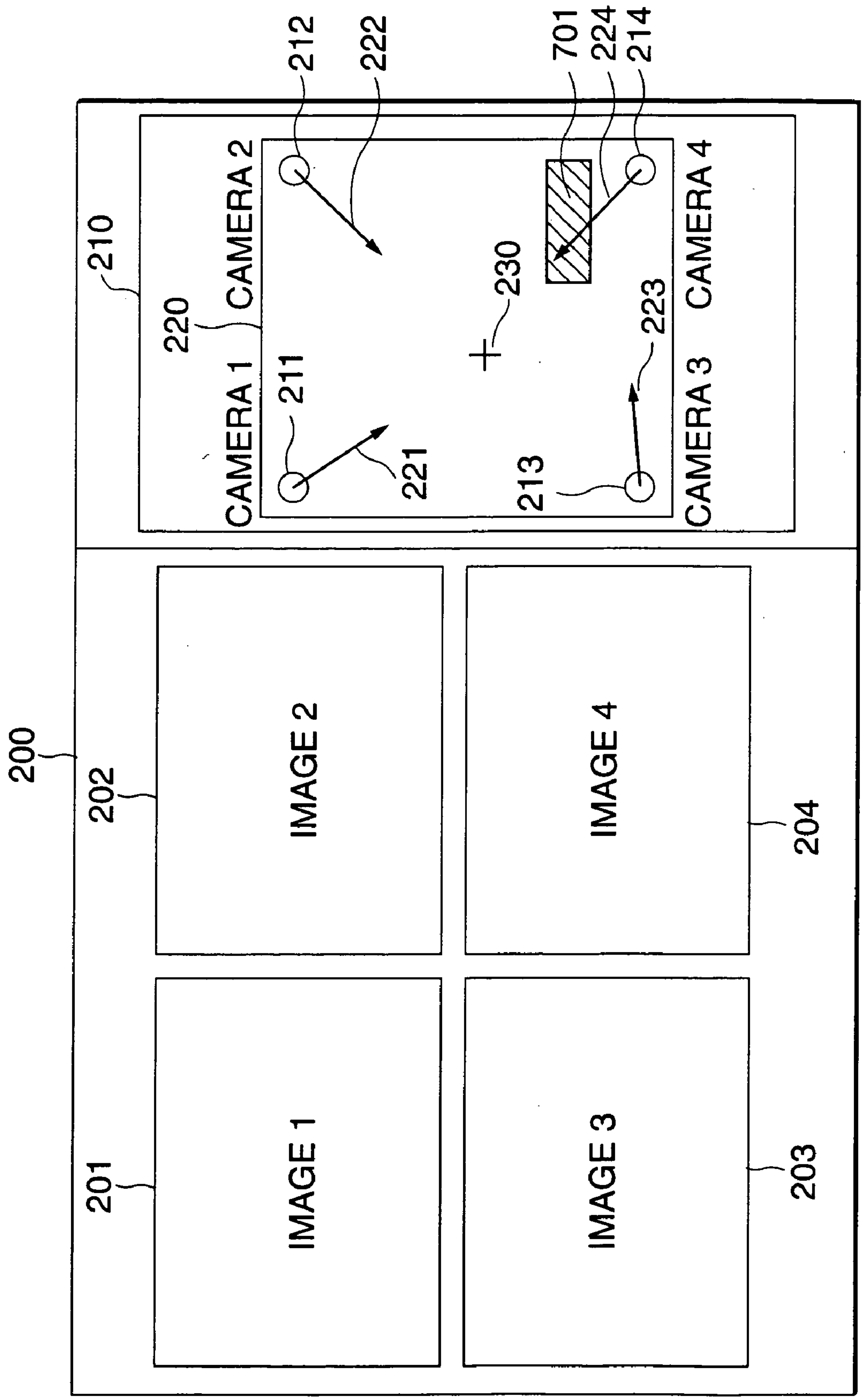
FIG. 7 is a schematic representation showing the layout of a display screen displayed on an image receiver according to second embodiment.

In example 1, on the basis of the camera angle information, the camera-to-be-operated determination section 125 determines, as a camera to be operated, the camera capable of most quickly panning toward a location designated by the operator, and produces a command used for actually panning the thus-determined camera. In the present example, there will be described a method of panning another camera rather than the thus-selected camera in the event of presence of an impediment along an imaginary extension between the camera and the designated location. FIG. 6 shows the configuration of a system embodying the method, and FIG. 7 shows an example impediment 701 on the map 220 provided in the camera control region 210 displayed on the screen 200 of the image receiver 120.

In FIG. 6, reference numerals 101, 102, 103, and 104 designate cameras; 110 designates an image transmitter for transmitting image data; 120 designates an image receiver for receiving the image data and playing back images; 105 designates a display for displaying the images; and 106 designates an input device connected to the image receiver 120.

The image receiver 120 shown in FIG. 6 corresponds to the image receiver 120 of the first embodiment additionally provided with an employable-camera survey section 601. The employable-camera survey section 601 eliminates a camera incapable of shooting the designated location from candidates considered by the camera-to-be-operated determination section 125. The camera-to-be-operated determination section 125 selects a camera on the basis of a determination made by the employable-camera survey section 601 as to whether or not the camera can shoot the designated location, as well as on the basis of the angle between the current shooting direction of the camera and the designated location. In other respects, the system is identical in configuration with that of the first embodiment shown in FIG. 1.

In the first embodiment, as shown in FIG. 2, a comparison is made between the angles 401 through 404; that is, the angle 401 between the current shooting direction of the camera 101 and an imaginary extension extending from the center of the camera symbol 211 to the location designated by the pointer 230; the angle 402 between the current shooting direction of the camera 102 and an imaginary extension extending from the center of the camera symbol 212 to the location designated by the pointer 230; the angle 403 between the current shooting direction of the camera 103 and an imaginary extension extending from the center of the camera symbol 213 to the location designated by the pointer 230; and the angle 404 between the current shooting direction of the camera 104 and an imaginary extension extending from the center of the camera symbol 214 to the location designated by the pointer 230. The camera corresponding to the minimum angle is determined as the camera to be operated.

In a case where capturing a certain location can be achieved through use of any of a plurality of cameras, there may be a case where an impediment is present between the designated location and a particular camera, thus blocking the camera from shooting the designated location. In the present example, there will be described a method of determining a camera to be operated from among employable cameras, by means of determining whether or not cameras can shoot the designated location, on the basis of the designated location, the positions of the cameras, and the position of an impediment, and selecting a camera from among the cameras determined to be employable.

Figure 8:
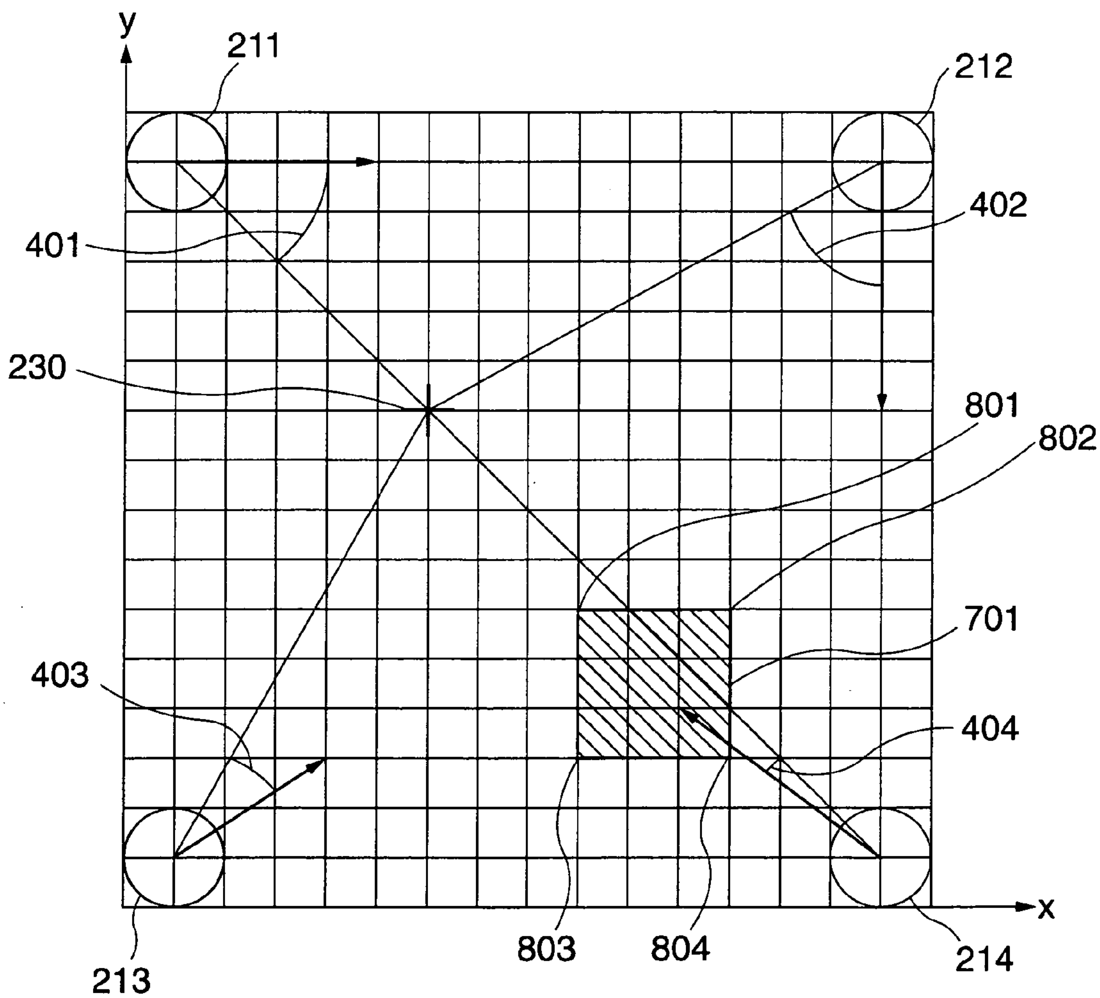
FIG. 8 is a schematic representation illustrating an example camera control region according to second embodiment.
Figure 9:
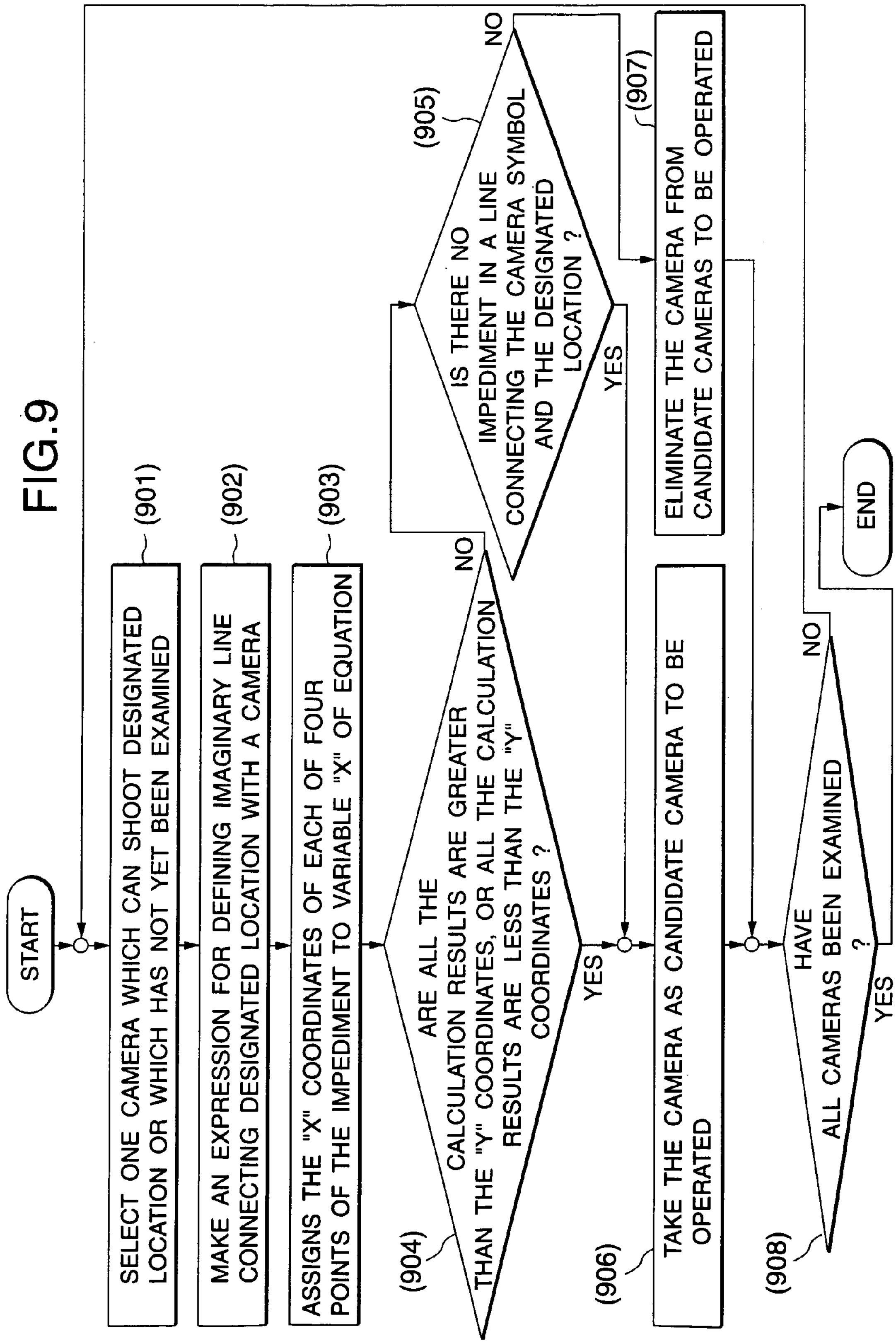
FIG. 9 is a flowchart showing processing required for determining which of the cameras is to be operated according to the second embodiment.

FIG. 8 shows an example layout including the location designated by the operator by way of the pointer 230; the locations of the camera symbols 211, 212, 213, and 214 assigned to the respective cameras 101, 102, 103, and 104; and the position of the impediment 701. FIG. 9 shows the flow of processing through which, on the basis of the designated location and the coordinates of an impediment, the employable-camera survey section 601 eliminates, from candidates considered in the camera angle examination performed by the camera-to-be-operated determination section 125, cameras incapable of shooting the designated location, even when panned, because of presence of an impediment. By reference to FIGS. 8 and 9, there will now be described an example flow of examination of cameras incapable of shooting the designated location, from among the plurality of cameras. There is selected one camera symbol to be assigned to a camera which has not yet been examined as to whether or not an impediment blocks the camera from shooting the designated location (step 901). In the example shown in FIG. 8, a camera symbol 211 is selected. The employable-camera survey section 601 connects the location designated by the pointer 230 and the center of the camera symbol 211 through use of an imaginary line, and calculates the position of the imaginary line in terms of a linear relation between "x" and "y" (902). In the example shown in FIG. 8, the imaginary line extending between the location designated by the pointer 230 and the camera symbol 211 is defined as $$y=-x+16 \qquad (2).$$

The employable-camera survey section 601 assigns the "x" coordinates of each of four points 801, 802, 803, and 804 of the impediment 701 to variable "x" of Equation 2 (step 903). The employable-camera survey section 601 compares the four calculation results with the "y" coordinates of the respective points 801, 802, 803, and 804 (step 904). If all the calculation results are greater than the "y" coordinates, or if all the calculation results are less than the "y" coordinates, the employable-camera survey section 601 takes the camera as a candidate for angle comparison performed by the camera-to-be-operated determination section 125 (step 906). If some calculation results are greater than the "y" coordinates and the other results are less than the same, the employable-camera survey section 601 examines whether or not an impediment is present between the location designated by the pointer 230 and the camera (step 905). In the example shown in FIG. 8, a "y" coordinate (6) of the point 802 is greater than a calculation result (4) obtained as a result of assigning the "x" coordinate of the point 802 to Equation 2. Further, the "y" coordinate (6) of the point 801 is less than the calculation result (7) obtained as a result of assigning the "x" coordinate (9) of the point 801 to Equation 2; the "y" coordinate (3) of the point 803 is less than the calculation result (7) obtained as a result of assigning the "x" coordinate (9) of the point 803 to Equation 2; and the "y" coordinate (3) of the point 804 is less than the calculation result (4) obtained as a result of assigning the "x" coordinate (12) of the point 804 to Equation 2. Therefore, the camera is examined by the employable-camera survey section 601 in step (905). In a case where no impediment is present between the designated location and the camera, no impediment blocks the field of view of the camera, and hence the camera is subjected to angle examination performed by the camera-to-be-operated determination section 125 (step 906). In the event of an impediment being present between the designated location and the camera, the impediment blocks the camera from shooting the designated location, and hence the camera is eliminated from the candidates for angle examination performed by the camera-to-be-operated determination section 125 (step 907). The coordinates of the center of the camera symbol 211 are (1, 15) and the coordinates of the pointer 230 designated by the operator are (6,10). Therefore, the camera 101 assigned the camera symbol 211 becomes a candidate for angle examination performed by the camera-to-be-operated determination section 125. All the cameras 101 through 104 which are present in the map 220 shown in FIG. 7 are subjected to the foregoing processing (step 908).

In the example shown in FIG. 8, an imaginary line connecting a camera symbol 212 with the pointer 203, an imaginary line connecting a camera symbol 213 with the pointer 230, and an imaginary line connecting a camera symbol 214 with the pointer 230 are respectively defined follows:

$$y=(5/9)x+(20/3) \qquad (3),$$

$$y=(9/5)x-(4/5) \qquad (4), \text{ and}$$

$$y=-x+16 \qquad (5).$$

With regard to the camera symbol 212, the "y" coordinate (6) of the point 801 is less than a calculation result (77/5) obtained as a result of assigning the "x" coordinate of the point 801 to Equation 3; the "y" coordinate (6) of the point 802 is less than a calculation result (104/5) obtained as a result of assigning the "x" coordinate of the point 802 to Equation 3; the "y" coordinate (3) of the point 803 is less than a calculation result (77/5) obtained as a result of assigning the "x" coordinate of the point 803 to Equation 3; and the "y" coordinate (3) of the point 804 is less than a calculation result (104/5) obtained as a result of assigning the "x" coordinate of the point 804 to Equation 3. Therefore, the camera 102 assigned the camera symbol 212 is taken as a candidate for selection as a camera to be operated (step 906).

With regard to the camera symbol 213, the "y" coordinate (6) of the point 801 is less than a calculation result (35/3) obtained as a result of assigning the "x" coordinate of the point 801 to Equation 4; the "y" coordinate (6) of the point 802 is less than a calculation result (40/3) obtained as a result of assigning the "x" coordinate of the point 802 to Equation 4; the "y" coordinate (3) of the point 803 is less than a calculation result (35/3) obtained as a result of assigning the "x" coordinate of the point 803 to Equation 4; and the "y" coordinate (3) of the point 804 is less than a calculation result (40/3) obtained as a result of assigning the "x" coordinate of the point 804 to Equation 4. Therefore, the camera 103 assigned the camera symbol 213 is taken as a candidate for selection as a camera to be operated (step 906).

With regard to the camera symbol 214, the "y" coordinate (6) of the point 801 is less than a calculation result (7) obtained as a result of assigning the "x" coordinate (9) of the point 801 to Equation 5; the "y" coordinate (3) of the point 803 is less than a calculation result (7) obtained as a result of assigning the "x" coordinate (9) of the point 803 to Equation 5; and the "y" coordinate (3) of the point 804 is less than a calculation result (4) obtained as a result of assigning the "x" coordinate (12) of the point 804 to Equation 5. Therefore, the camera 104 assigned the camera symbol 214 is subjected to processing pertaining to step (906). Since the coordinates of the center of the camera symbol 214 are (15,1) and the coordinates of the pointer 230 specified by the operator are (6,10), the camera 104 is eliminated from candidates for selection performed by the camera-to-be-operated determination section 125 (step 907). The camera-to-be-operated determination section 125 selects a camera to be operated from among the cameras determined as being candidates for selection performed by the camera-to-be-operated determination section 125.

The method of determining a camera to be operated and the flow of operation of the cameras 101, 102, 103, and 104 connected to the image transmitter 110 are the same as those employed in the first embodiment.

In FIG. 6, the employable-camera survey section 601 delivers the coordinates of the impediment 701 to the camera control area display section 123, and the camera control area display section 123 displays the impediment 701 on the map 220 within the camera control region 210. However, display of the impediment 701 may be omitted.

In a case where the impediment 701 is displayed, the operator can ascertain the location of the impediment 701. In contrast, in a case where the impediment 701 is not displayed, the task of the image receiver 120 is diminished by the amount corresponding to that imposed by the image receiver 120 in displaying an impediment, thus increasing processing speed. Further, the image receiver 120 performs all the operations required for determining a camera to be operated in consideration of information about an impediment. Therefore, the present example can yield an advantage of eliminating the necessity of the operator being aware of an impediment.

As mentioned above, in the present example, in a case where an impediment is present at an actual location within the camera control region 210 or the map 220, the employable-camera survey section 601 eliminates, from candidates for selection performed by the camera-to-be-operated determination section 125, a camera which is hindered by an impediment from shooting the location designated by the pointer 230.

As a result, even if an impediment blocks the view field of a certain camera and hinders the camera from shooting the location designated by the operator, the system can be set so as to avoid selection of that camera, thereby preventing a situation in which an impediment blocks the camera directed toward the designated location. Thus, the present example yields a large practical effect.

Third Embodiment

In the first embodiemnt, the image receiver 120 selects a camera capable of panning toward the designated location most quickly, on the basis of the angles of the cameras. In the present example, two factors are employed as conditions for selecting a camera to be operated; that is, the angle and focus of a camera. In order enable comparison among cameras in terms of two factors of different scales; that is, between the angle and focus of the camera, these factors are converted into two factors capable of being compared; that is, the time required for the camera to pan toward the designated location, and the time required for the camera to attain a focus on the designated location. The configuration of a system embodying the method of the present invention is shown in FIG. 10.

The image receiver 120 of the present example corresponds to the image receiver of the first embodiment additionally provided with an angular-shift-time calculation section 1001 for calculating the time required for the camera to pan toward the designated location; a focus storage section 1002 for grasping the focus of a plurality of cameras; and a focus-shift-time calculation section 1003 for calculating the time required for the camera to attain a focus on the designated location.

In first embodiment, the camera-to-be-operated determination section 125 determines a camera to be operated from the angle between the current shooting direction of the camera and the direction of an imaginary line connecting the center of the camera symbol with the designated location. In contrast, in the third embodiment, the camera-to-be-operated determination section 125 determines, as a camera to be operated, a camera which is directed toward the designated location and attains a focus on the designated location most quickly. In other respects, the system of the present example is identical in configuration with the system of the first embodiment.

Figure 10:
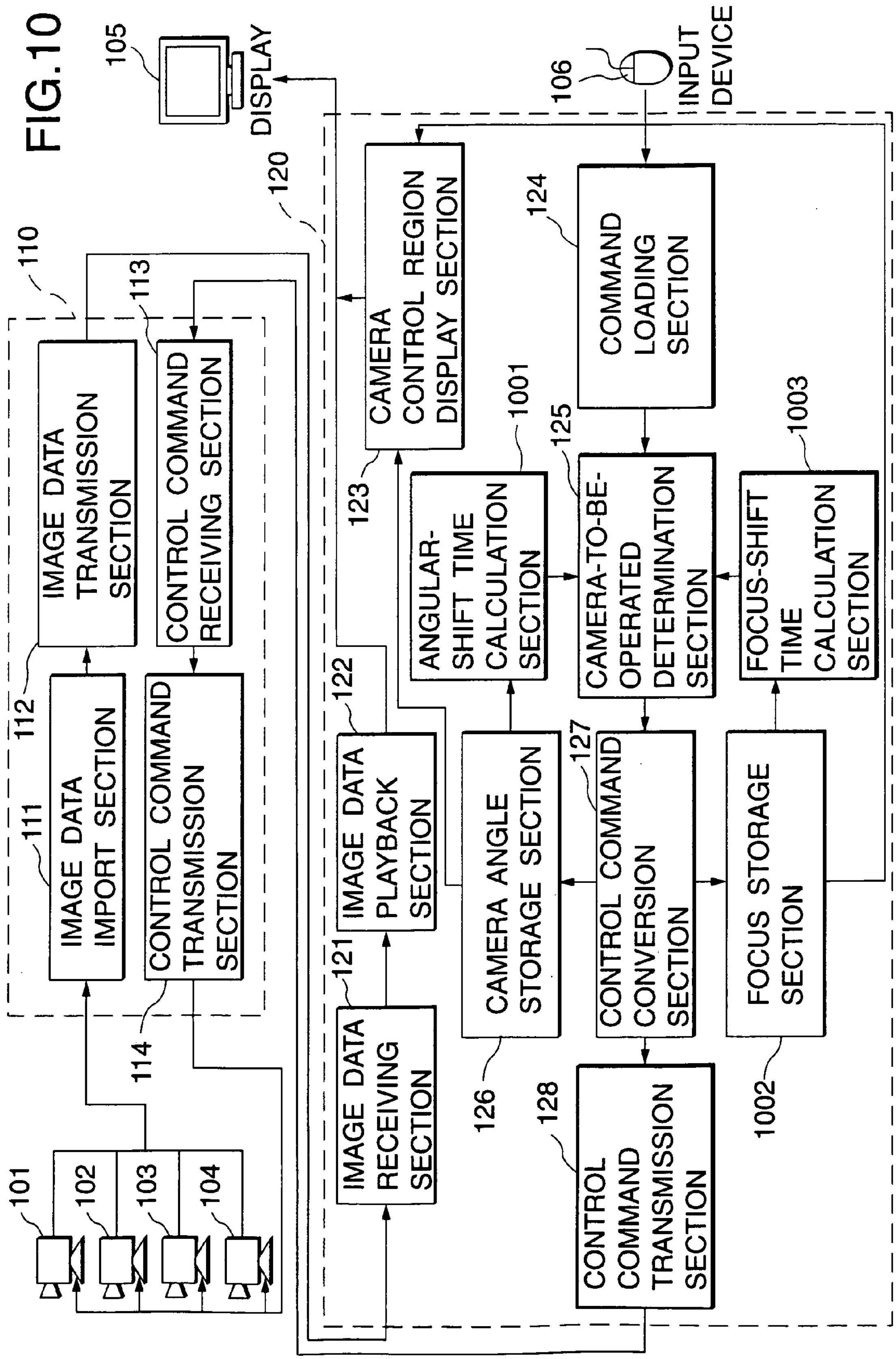
FIG. 10 is a block diagram showing the configuration of a camera control system according to third embodiemnt of the present invention.
Figure 11:
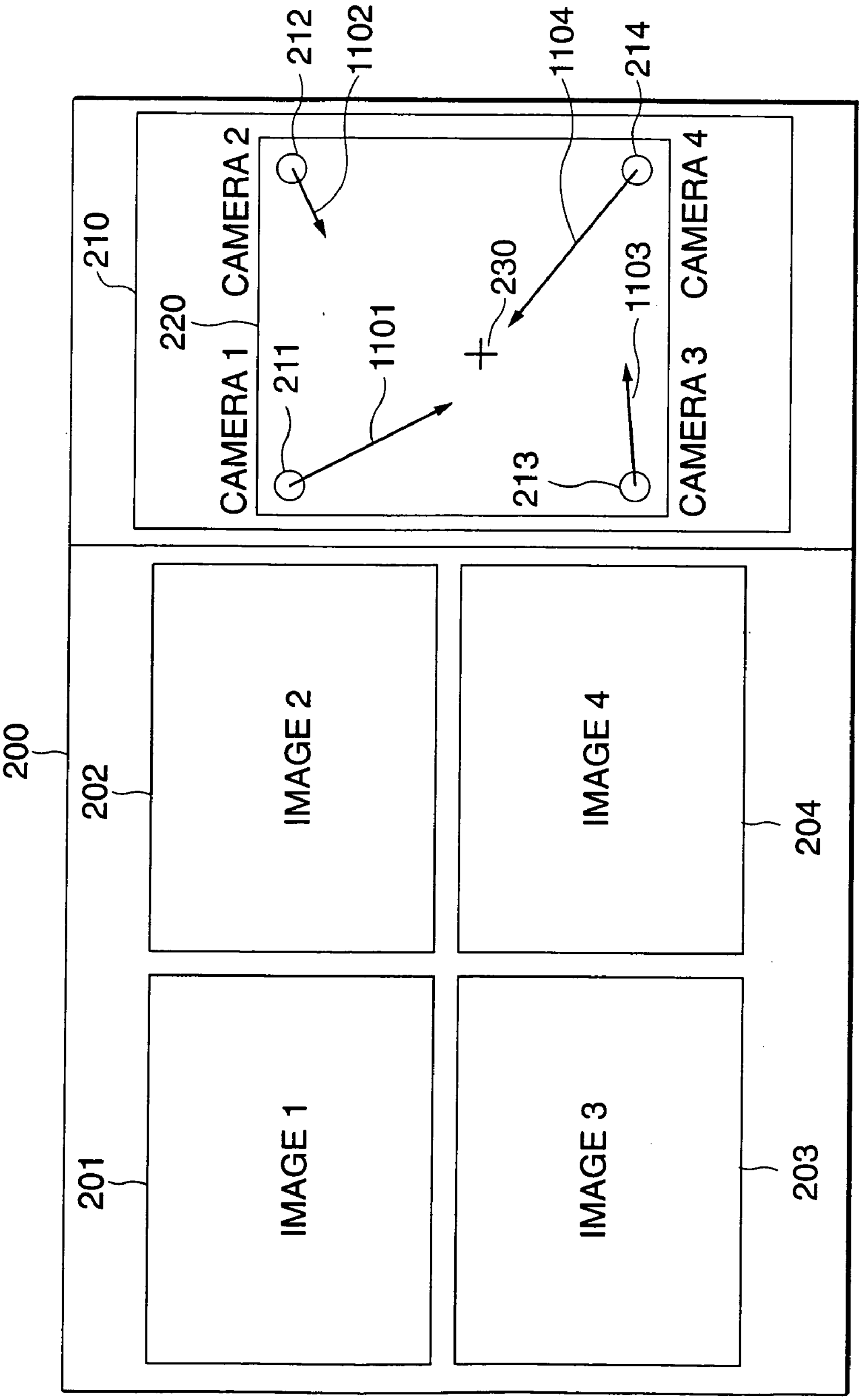
FIG. 11 is a schematic representation showing the layout of a display screen displayed on an image receiver according to the third embodiment.

FIG. 11 shows an example display indicated on the screen of the display 105 shown in FIG. 10, in which the direction of an arrowy line depicts the shooting direction of a camera and the length of the arrowy line depicts the focus of the camera. From the lengths of respective arrows 1101, 1102, 1103, and 1104 depicting the shooting directions of the cameras, the operator can grasp the locations on which the cameras are focused.

Figure 12:
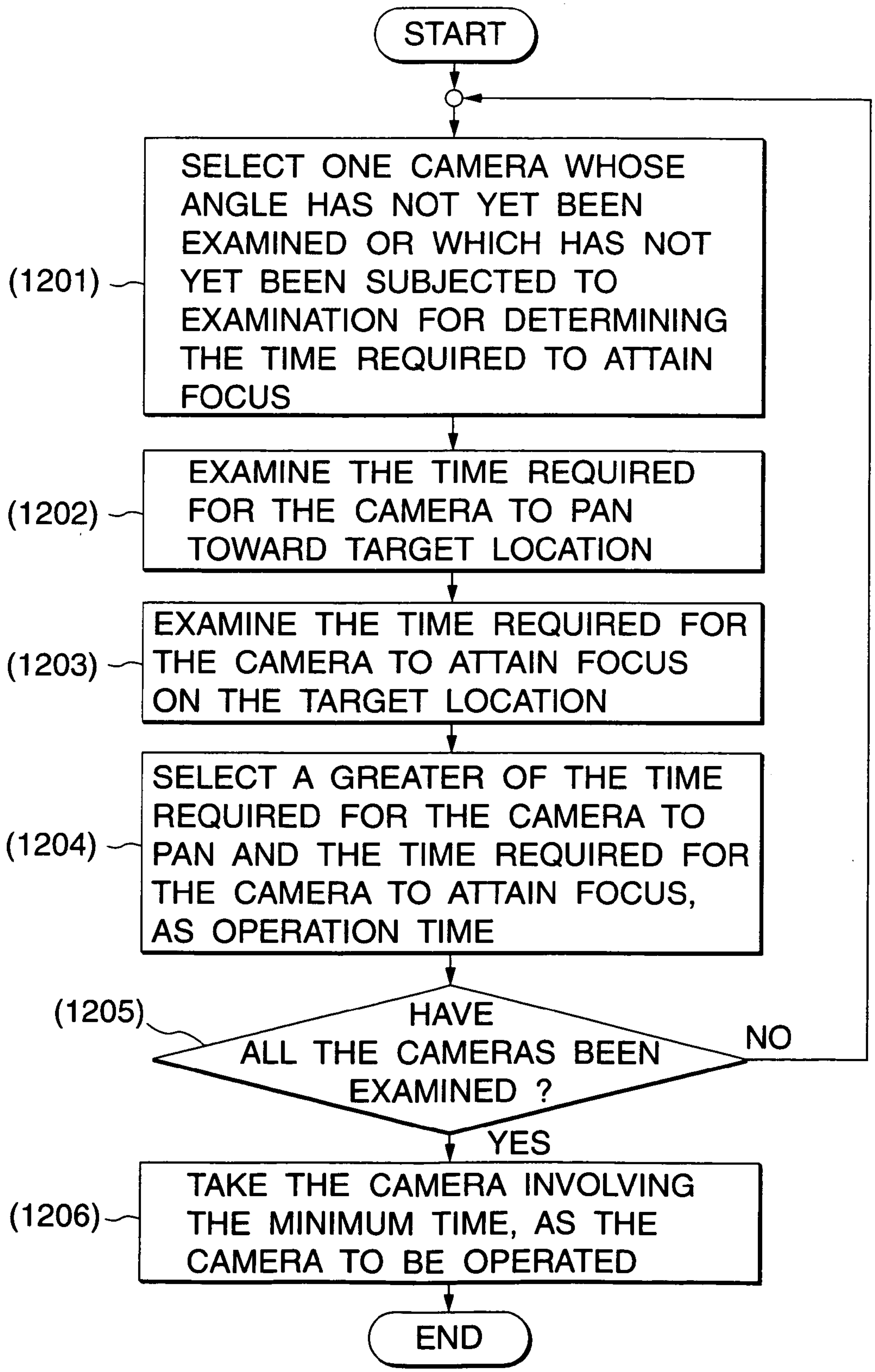
FIG. 12 is a flowchart showing processing required for determining which of cameras is to be operated according to the third embodiment.

FIG. 12 shows the flow of determination of a camera to be operated on the basis of the two factors; that is, the angle between the designated location shown in FIG. 11 and the direction of an imaginary line connecting the center of a camera symbol and the shooting direction of a camera. The flow of determination will now be described by reference to FIGS. 10 through 12, as well as FIG. 4, which is taken as an example layout of camera symbols. When the operator specifies a desired location in the map 220 through use of the pointer 230 shown in FIG. 11, the command load section 124 loads the location on the map 220. In the example shown in FIG. 4, the command load section 124 loads the coordinates (6, 10) of the location designated by the operator by way of the pointer 230. An angular-shift-time conversion section 210 and a focus-shift-time calculation section 212 receive the coordinates (6,10) of the point which are designated by the operator through use of the pointer 230 and are loaded by way of the command load section 124.

The angular-shift-time calculation section 1001 shown in FIG. 10 selects one from the camera symbols which are present in the camera control region 210 shown in FIG. 10 (step 1201). The camera symbol 211 is selected in the example shown in FIG. 4. The angular-shift-time calculation section 1001 loads the shooting direction of the camera selected in step (step 1201) from the camera angle storage section 126. The angular-shift-time calculation section 1001 calculates the time required for the camera to pan toward the designated location, from the coordinates of the designated location and the shooting direction of the camera (step 1202). In the present example, provided that a camera pans through 15 degrees in one second, and that the angle 401 between the shooting direction of the camera 101 shown in FIG. 4 and the imaginary line connecting the center of the camera symbol 211 with the location designated by the pointer 230 is 45 degrees, the camera 101 assigned the camera symbol 211 takes 45/15=3 sec. to pan toward the designated location.

The camera-to-be-operated determination section 125 loads a time of three seconds calculated in step (step 1202), and the focus storage section 1002 delivers, to the focus-shift-time calculation section 1003, the focus length of the camera selected in step (step 1201). The focus-shift-time calculation section 1003 calculates the time required for a camera to attain a focus on the designated location, from the coordinates of the designated location and the length of the focus (step 1203). Provided that shifting the focus of a camera by one unit length takes one second in the present example and that the focus length of the camera symbol 211 is four in the example shown in FIG. 4, the camera 101 assigned the camera symbol 211 takes a period of 7.1/4=1.8 sec. to attain a focus on the designated location. The camera-to-be-operated determination section 125 receives a period of 1.8 sec. calculated in step (step 1203).

The camera-to-be-operated determination section 125 selects the greater of the time required for the camera to pan toward the designated location and the time required for the camera to attain a focus on the designated location, the selects a greater time (step 1204). The time that the camera 101 assigned the camera symbol 211 requires to pan, as calculated in step (step 1202), is 3 sec., and the time calculated in step (step 1203) is 1.8 sec. The camera 101 assigned the camera symbol 211 takes 3 sec. to pan toward the designated location and to attain a focus on the designated location. All the other cameras are subjected to similar time calculation operations (step 1205).

In the example shown in FIG. 4, the camera 102 assigned the camera symbol 212 takes 4 sec. to pan toward the location designated by the pointer 230; the camera 103 assigned the camera symbol 213 takes 2 sec. to pan toward the same location; and the camera 104 assigned the camera symbol 214 takes 3 sec. to pan toward the same location. Further, the camera 102 takes 2.2 sec. to attain a focus on the designated location; the camera 103 takes 2.8 sec. to attain a focus on the same location; and the camera 104 takes 2.6 sec. to attain a focus on the same location. Hence, the camera 102 takes 4 sec. to pan toward and attain a focus on the designated location; the camera 103 takes 2.8 sec. to pan toward and attain a focus on the same location; and the camera 104 takes 3 sec. to pan toward and attain a focus on the same location. Thus, each camera is assigned a single time factor, and a camera assigned the minimum time factor can pan toward and attain a focus on the designated location most quickly. This camera is determined as the camera to be operated (1206).

In the present example, the camera-to-be-operated determination section 125 determines the camera 103 assigned the camera symbol 213 as a camera to be operated. The control command conversion section 127 receives information about the angle of the camera 103 and converts the information into a control command to be used for moving the camera 103. The control command is delivered to the control command transmission section 128, and the control command receiving section 113 of the image transmission section 110 receives the control command. The flow of subsequent processing is the same as that employed in the first embodiment.

In the present example, the arrows 1101, 1102, 1103, and 1104 depicting the shooting directions of the cameras 101, 102, 103, and 104 illustrate the depths of their focuses. However, employment of this illustration is not inevitable. In a case where the focal depths of the cameras are displayed, the operator can ascertain the locations on which the cameras are focused. In contrast, in a case where the focal depths of the cameras are not displayed, the task of the image receiver 120 is diminished by the amount corresponding to that imposed by the camera control region display section 123 in displaying the focal depths, thus increasing processing speed. Further, the image receiver 120 performs all the operations required for determining a camera to be operated in consideration of information about the focuses. Therefore, the present example can yield an advantage of eliminating the necessity of the operator to be aware of the focal depths of the cameras.

As mentioned above, in the present example, the focuses of respective cameras have been grasped beforehand. With regard to the respective camera, there are calculated the time required for the camera to pan toward the designated location, as well as the time required for the camera to attain a focus on the designated location. With regard to respective camera, the time required for the camera to pan toward and attain a focus on the designated location is calculated from these time periods. Through comparison between the thus-calculated times, there is selected a camera capable of panning toward and attaining a focus on the designated location most quickly, thus enabling selection of a camera optimal for shooting. Thus, the present example yields a great practical effect.

Fourth Embodiment

Figure 13:
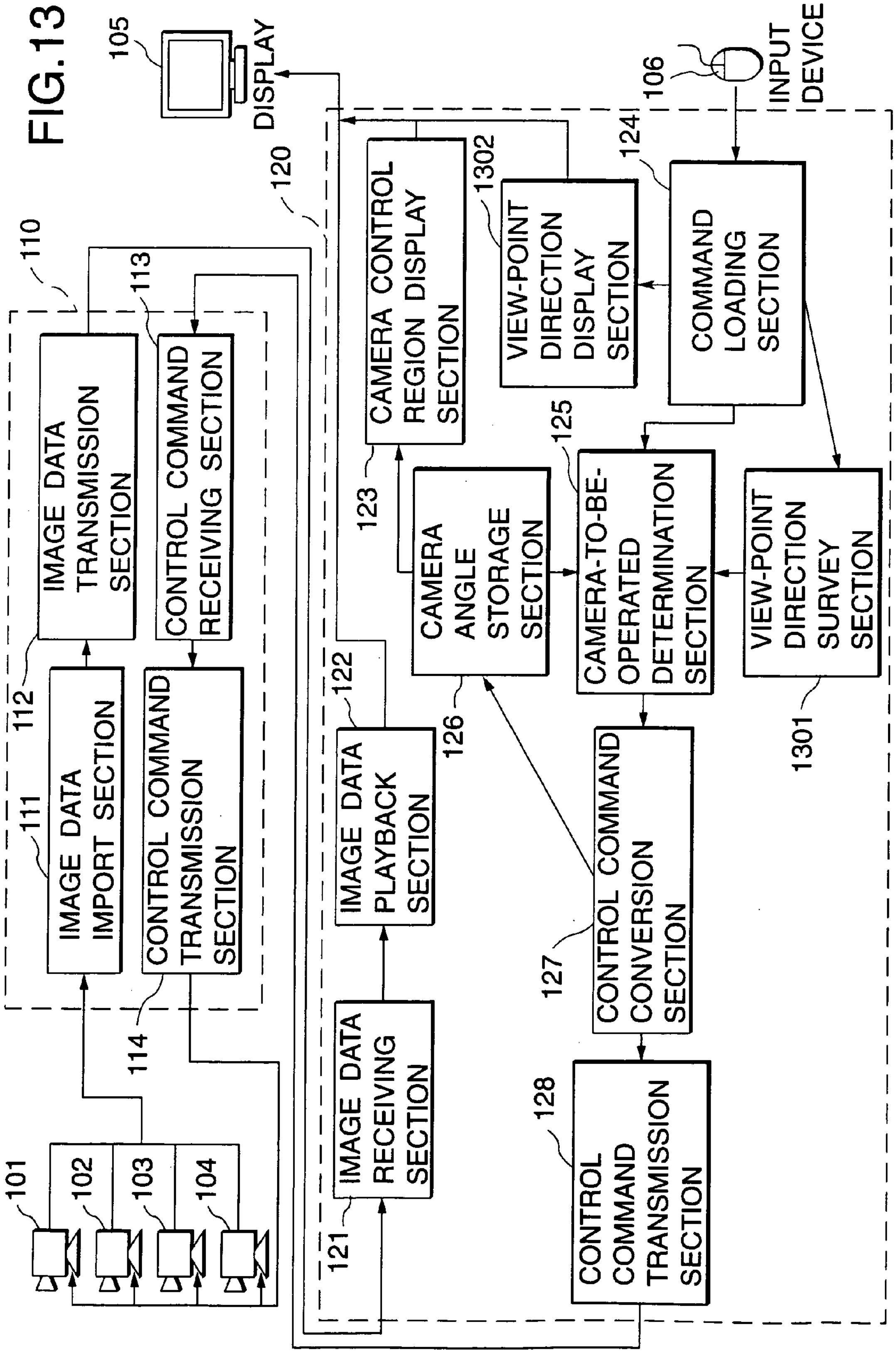
FIG. 13 is a block diagram showing the configuration of a camera control system according to fourth embodiment of the present invention.

In the first embodiment, the image receiver 120 determines, from the information about the angles of cameras, the camera capable of panning most quickly toward the designated location most quickly, and determines as well a command for actually panning the camera. However, even when the camera determined according to this method captures an image of the designated location, the operator may be dissatisfied with the image, if the image is not captured from the direction desired by the operator. In the present example, after having designated a desired location, the operator specifies a desired shooting direction, thus enabling selection of a camera which can capture an image from the direction desired by the operator. FIG. 13 shows the configuration of a system embodying the present example.

In the embodiment shown in FIG. 13, reference numerals 101, 102, 103, and 104 designate cameras; 110 designates an image transmitter; 120 designates an image receiver; 105 designates a display; and 106 designates an input device.

The image receiver 120 of the present example corresponds to an image receiver of the first embodiment additionally provided with a view-point direction survey section 1301 which stores the direction in which the operator desires to shoot his designated location; and a view-point direction display section 1302 for displaying the desired direction together with the camera control region display section 123. The camera-to-be-operated determination section 125 determines the camera to be operated, from information as to whether or not an image can be shot in the direction designated by the view-point survey section 1301, as well as from the angle between the current shooting direction of the camera and the direction of an imaginary line connecting the designated location with the center of the camera symbol. In other respects, the system of the present example is identical in configuration with that of the first embodiment.

Figure 14:
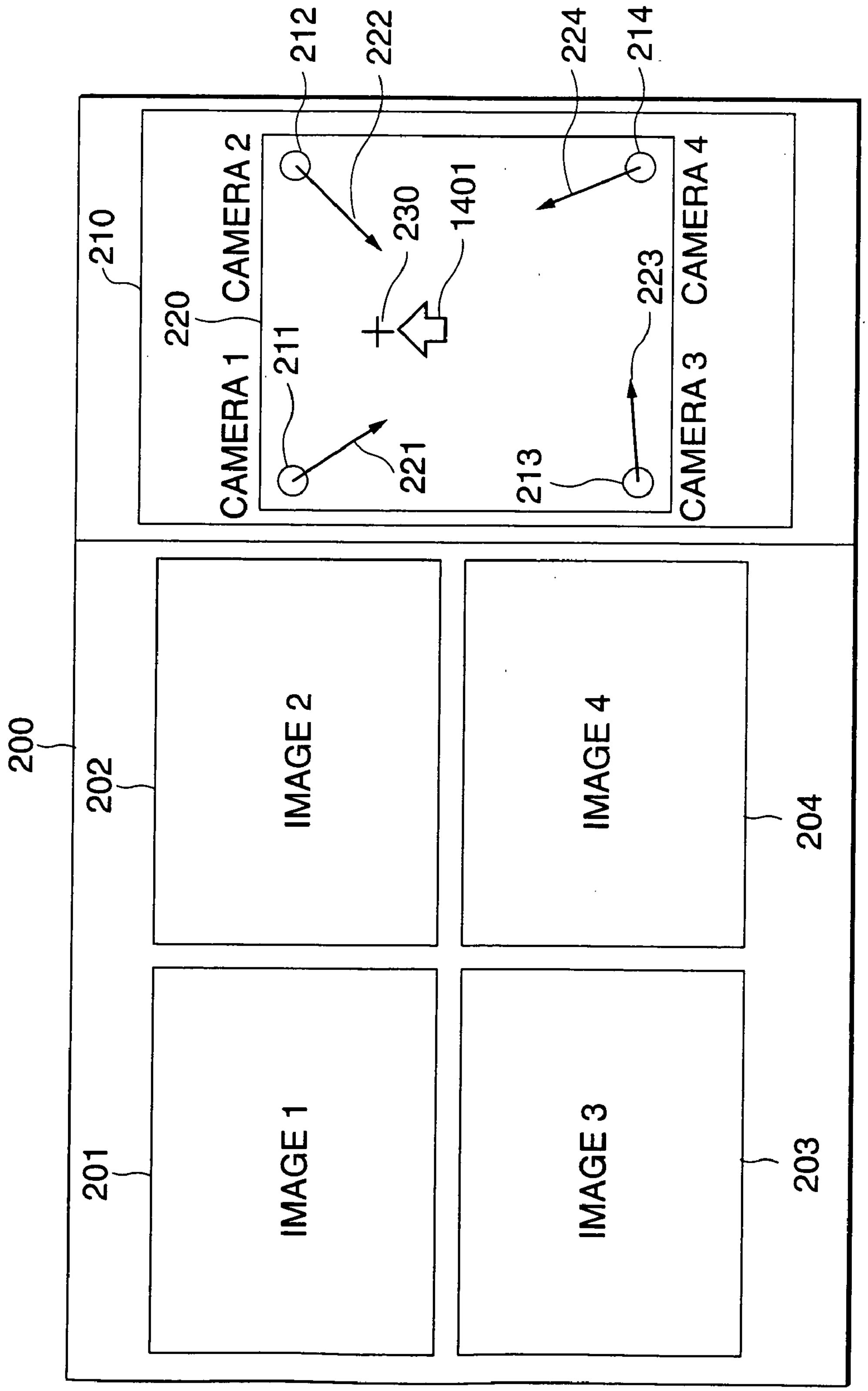
FIG. 14 is a schematic representation showing the layout of a display screen displayed on an image receiver according to the fourth embodiment.

FIG. 14 shows an example of the screen 200 to be displayed on the display 105 when the view-point direction display section 1302 displays a desired direction designated by the operator. In the present embodiment, after having specified a desired location on the map 220 by the operator by way of the pointer 230, the operator specifies the direction in which the location designated by the pointer 230 is to be viewed, by means of rotation of an arrow 1401 around the pointer 230.

Figure 15:
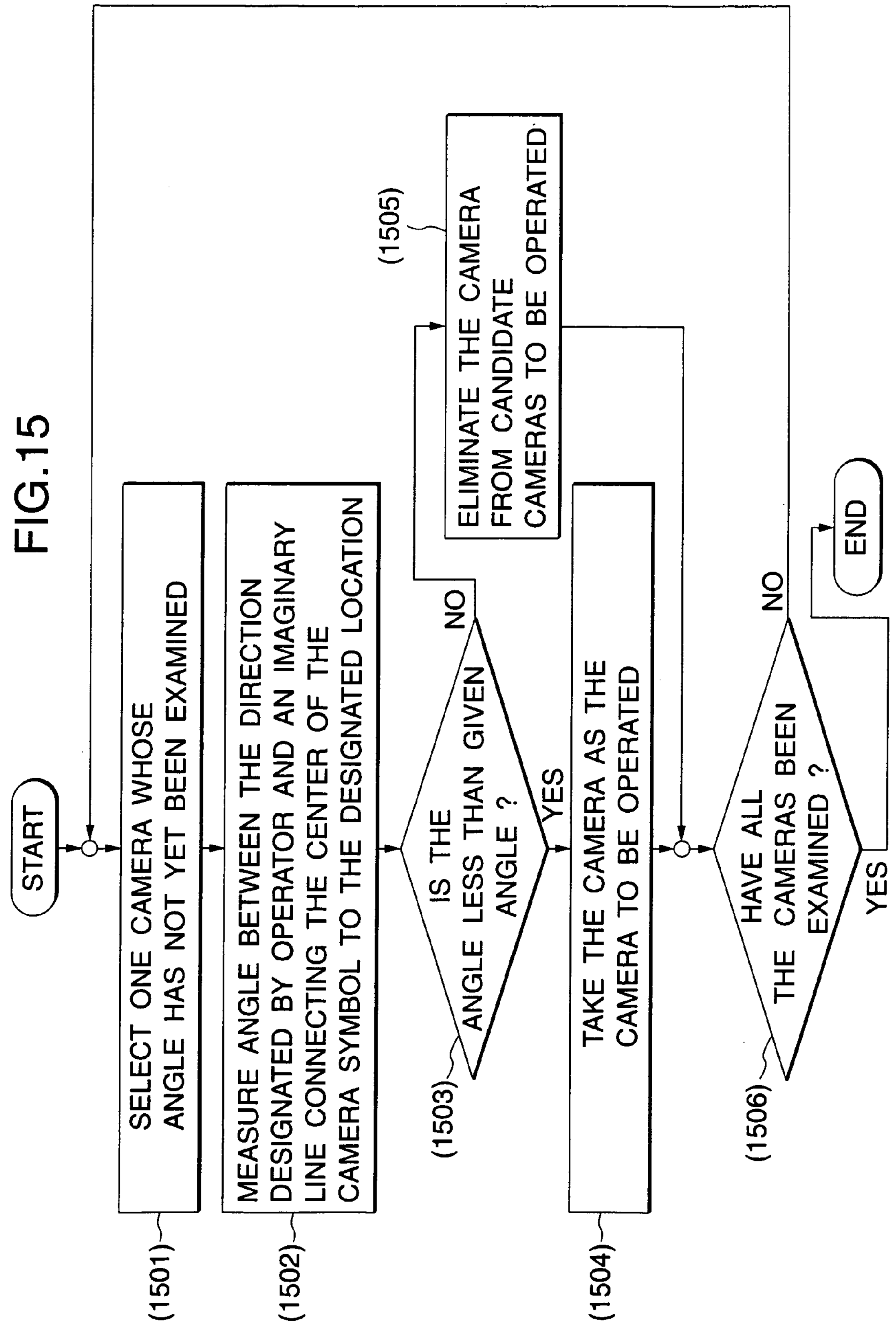
FIG. 15 is a schematic representation illustrating an example camera control region according to the fourth embodiment.

FIG. 15 shows the flow of selection of a camera capable of shooting an image in a direction close to a desired shooting direction when the operator designates a desired direction in which the designated location is to be shot. When the operator specifies a desired location and a direction in which the operator desires to shoot the desired location, the command load section 124 shown in FIG. 13 loads the position and direction of the designated location. By reference to the information received by the command load section 124, the view-point direction survey section 1301 selects from all the cameras the camera optimal for shooting the designated location and direction. First, one camera is selected from all the cameras (step 1501). There is examined the direction of the camera which would result if the thus-selected camera were panned toward the designated location.

Figure 16:
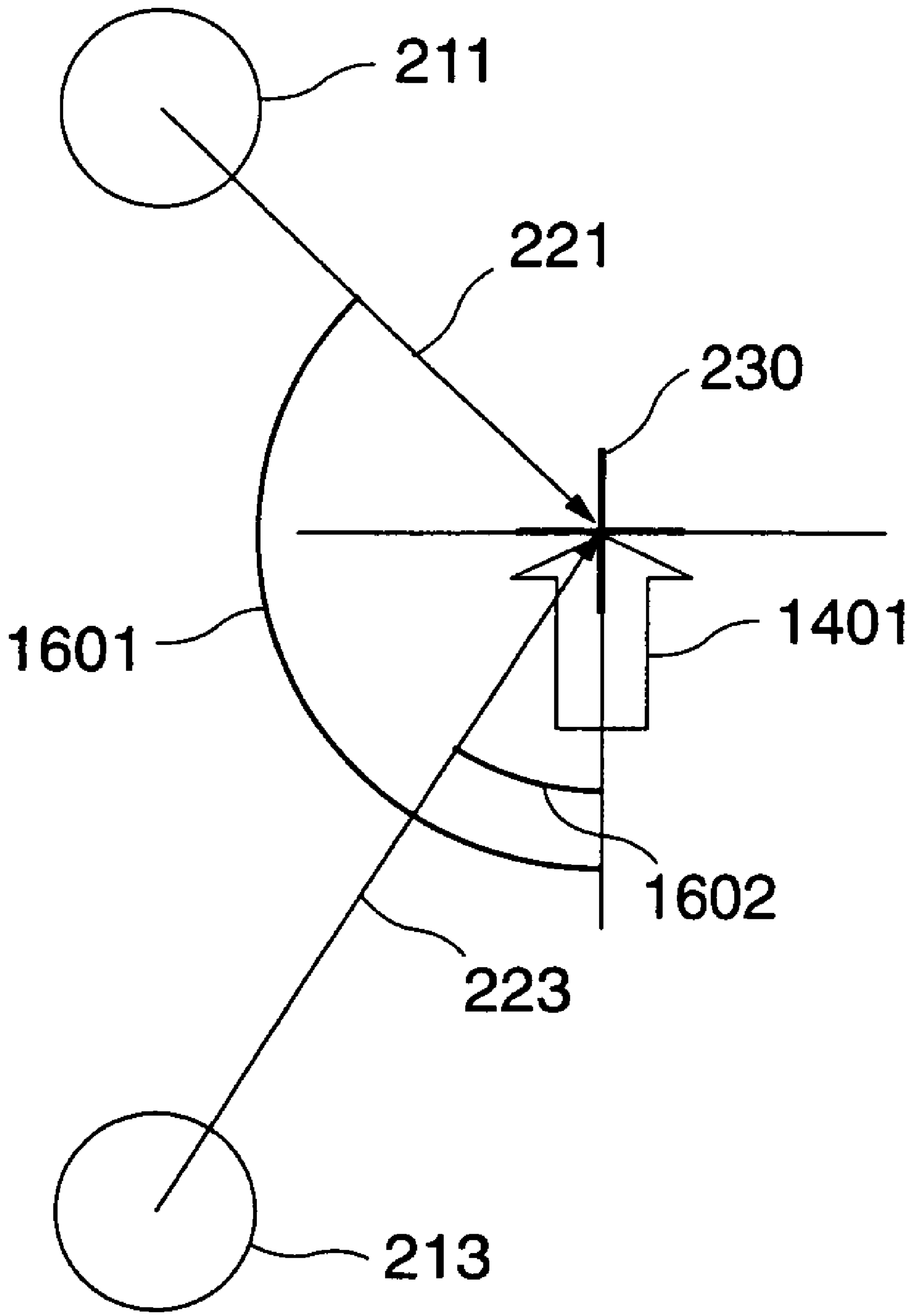
FIG. 16 is a flowchart showing processing required for determining which of the cameras is to be operated according to the fourth embodiment.

FIG. 16 shows an example angle between the designated direction and the direction of the camera when the camera is panned toward the location designated by the pointer 230. The drawing shows the location designated by the pointer 230; the arrow 1401 depicting the direction in which the operator desires to shoot the designated location; the direction 221 in which the camera 101 assigned the camera symbol 211 would shoot the location designated by the pointer 230; the direction 223 in which the camera 103 assigned the camera symbol 213 would shoot the location designated by the pointer 230; an angle 1601 between the direction 221 of the camera symbol 211 and the direction of the arrow 1401; and an angle 1602 between the direction 223 of the camera symbol 213 and the direction of the arrow 1401. In the present example, the angle 1601 between the camera symbol 211 and the arrow 1401 is measured (step 1502), and a determination is made as to whether or not the thus-measured angle 1601 is greater than a certain angle (step 1503).

In the present embodiment, the certain angle is set to 90 degrees. However, the magnitude of the certain angle may assume any value. If the certain angle is smaller than 90 degrees, the camera is deemed capable of being panned toward the designated location and is subjected to the examination performed by the camera-to-be-operated determination section 125 as to whether or not the camera can be panned toward the designated location most quickly (step 1504). If the certain angle is greater than 90 degrees, the camera is deemed as being incapable of shooting the designated location in the designated direction. The camera is eliminated from candidates for selection of a camera performed by the camera-to-be-operated determination section 125 (step 1505). The angles of all the cameras are examined (step 1506).

The angle 1601 of the camera symbol 211 assumes 130 degrees, which is greater than 90 degrees, and hence the camera 101 assigned the camera symbol 211 is eliminated from candidates for examination performed by the camera-to-be-operated determination section 125. The angle 1602 of the camera symbol 213 assumes 30 degrees, which is less than 90 degrees, and hence the camera 103 assigned the camera symbol 213 is selected as a candidate for the examination performed by the camera-to-be-operated determination section 125. The result of examination of camera angles; that is, the camera 103 assigned the camera symbol 213 having been determined as a candidate for the examination and the camera 101 assigned the camera symbol 211 having been determined to be eliminated from the candidates for the examination, are reported to the camera-to-be-operated determination section 125. The camera-to-be-operated determination section 125 selects one from the cameras which have been determined to be candidates for examination. Subsequent processing up to process in which the cameras 101, 102, 103, and 104 are operated is the same as that employed in the first embodiment.

The command load section 124 reports to the view-point direction display section 1302 the direction in which the designated location is to be shot. The view-point direction display section 1302 displays, on the camera control region 210 shown in FIG. 14, the arrow 1401 representing the designated direction.

Although in the present example, the view point direction 1302 displays the desired direction 1401; this is not inevitable. In a case where the direction 1401 in which the operator desires to shoot the desired location is displayed, the operator can ascertain from the display the direction in which the designated location is to be viewed. In contrast, in a case where the desired direction 1401 is not displayed, the task of the image receiver 120 is diminished by the amount corresponding to that imposed by the image receiver 120 display the desired direction 1401, thus increasing processing speed.

As mentioned above, the image receiver 120 receives a command for specifying the direction in which the designated location is to be shot, as well as the designated location. The image receiver 120 then eliminates cameras from candidates for selection those incapable of shooting the designated location in the designated direction. As a result, the view-point direction survey section 1301 can automatically narrow the candidates for selection of a camera capable of shooting an image of the designated location in the desired direction. A camera capable of being panned most quickly to the desired direction and location can be automatically selected, thus yielding a great practical advantage.

Fifth Embodiment

Figure 17:
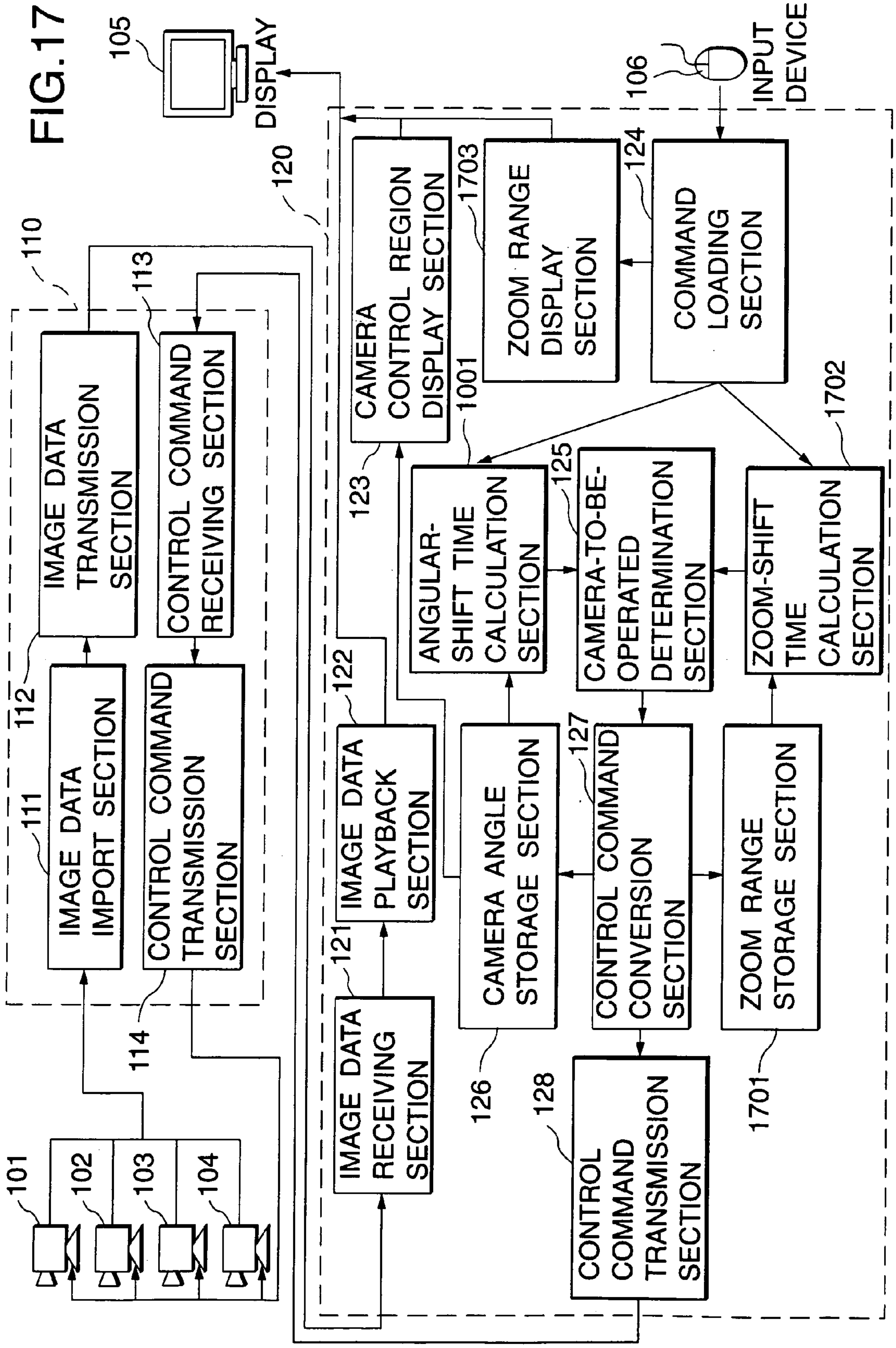
FIG. 17 is a block diagram showing the configuration of a camera control system according to fifth embodiment of the present invention.

In the first embodiment, a camera having the minimum angle between the shooting direction and an imaginary line connecting the designated location with the center of the camera symbol is determined as the camera capable of being panned toward the designated location most quickly, and the thus-determined camera is operated. In the present example, the camera is selected in consideration of the zoom of the camera as well as the angle of the camera. Accordingly, the operator directly specifies a desired range rather than a desired location. FIG. 17 shows the configuration of a system embodying such a method.

In FIG. 17, reference numerals 101, 102, 103, and 104 designate cameras; 110 designates an image receiver for receiving an image; 105 designates a display for displaying a received image; and 106 designates an input device connected to the image receiver 120.

The image receiver 120 of the present example corresponds the image receiver 120 of the first embodiment additionally provided with the angular-shift-time calculation section 1001 of the third embodiment for calculating the time required for the camera to pan toward the designated location; a zoom storage section 1701 for grasping the degree of zoom of a plurality of cameras; a zoom-shift time calculation section 1702 for calculating the time required for a camera to zoom in order to display an image of the designated range; and a zoom range display section 1703 for displaying, in the camera control region 210, a range to be zoomed.

The camera-to-be-operated determination section 125 determines the camera to be operated, from the time required for the camera to pan toward the designated location and the time required for the camera to zoom in or out for capturing an image of the range designated by the operator. In other respects, the system of the present example is identical in configuration with that of the first embodiment shown in FIG. 1.

Figure 18:
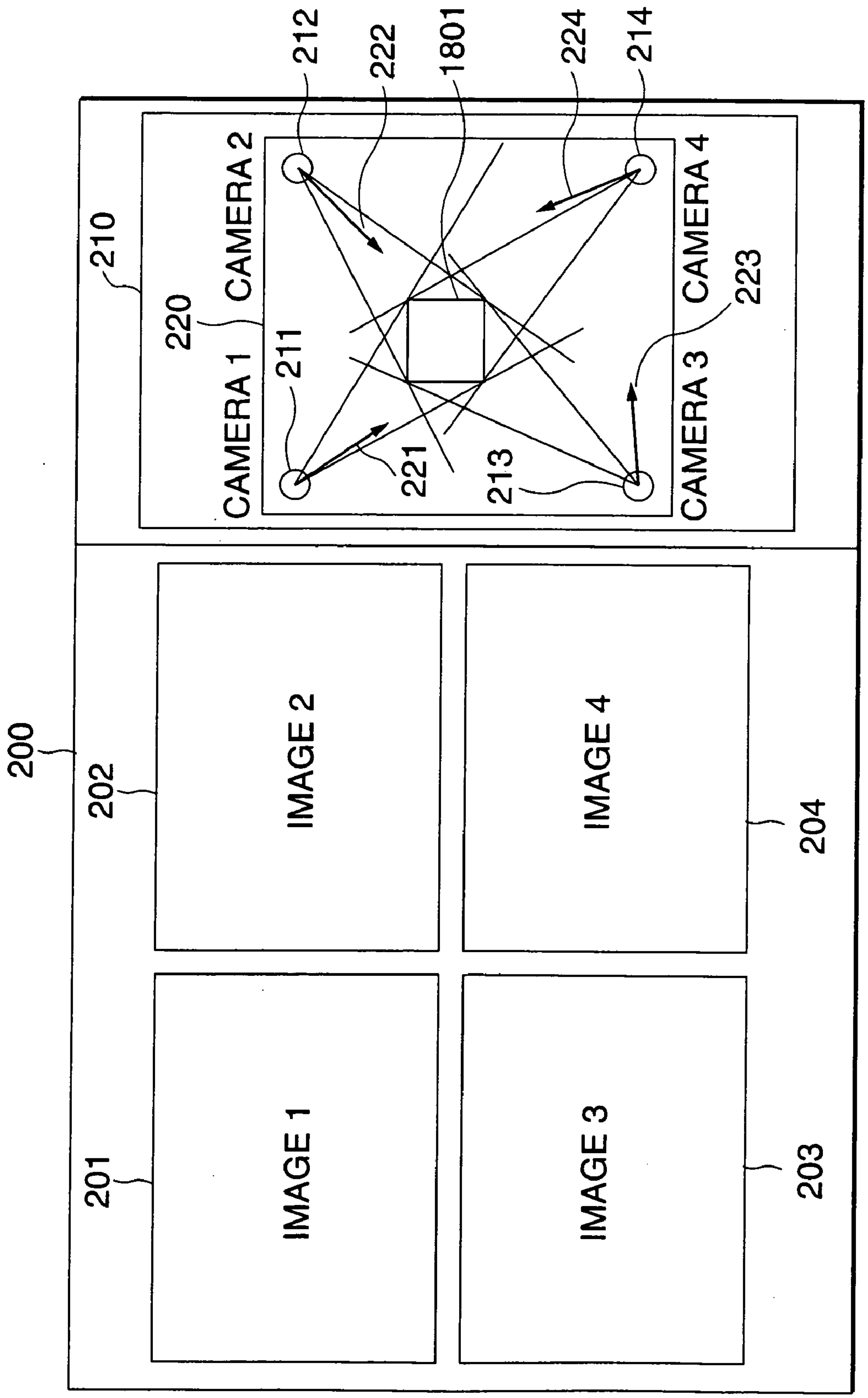
FIG. 18 is a schematic representation showing the layout of a display screen displayed on an image receiver according to the fifth embodiment.

FIG. 18 shows an example screen layout in which the zoom range display section 1703 specifies a camera zoom range in the camera control region 210. The screen layout is formed by addition, to the camera control region 210 of the first embodiment, of a zoom range 1801 in which the user specifies a desired range. In other respects, the screen layout is identical with that of the first embodiment shown in FIG. 2.

Figure 19:
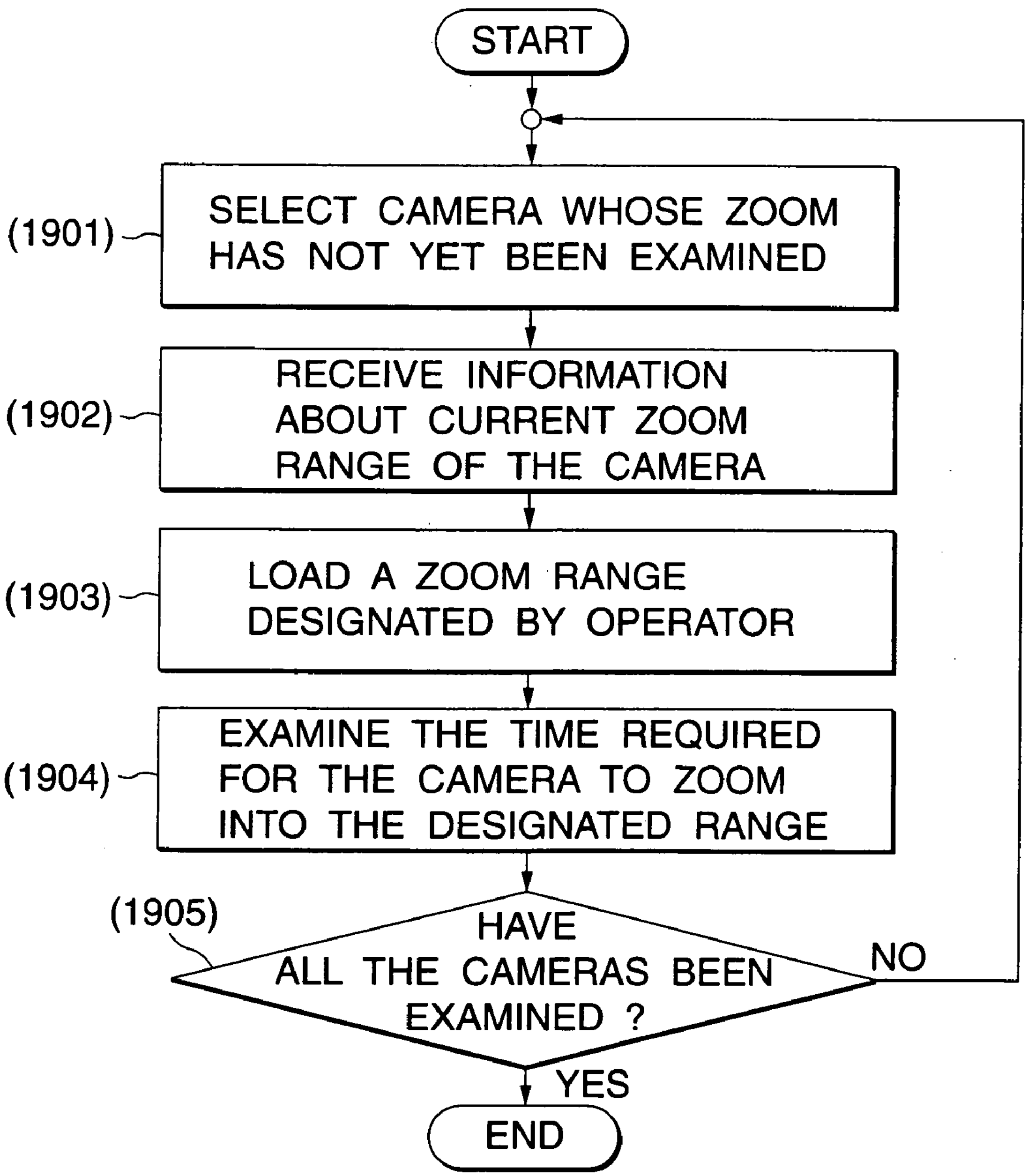
FIG. 19 is a flowchart showing processing required for determining which of the cameras is to be operated according to the fifth embodiment.

FIG. 19 shows the flow of selection of a camera capable of panning toward a designated direction and zooming into a range designated by the operator when the operator designates a range in which he desired to view an image.

Figure 20:
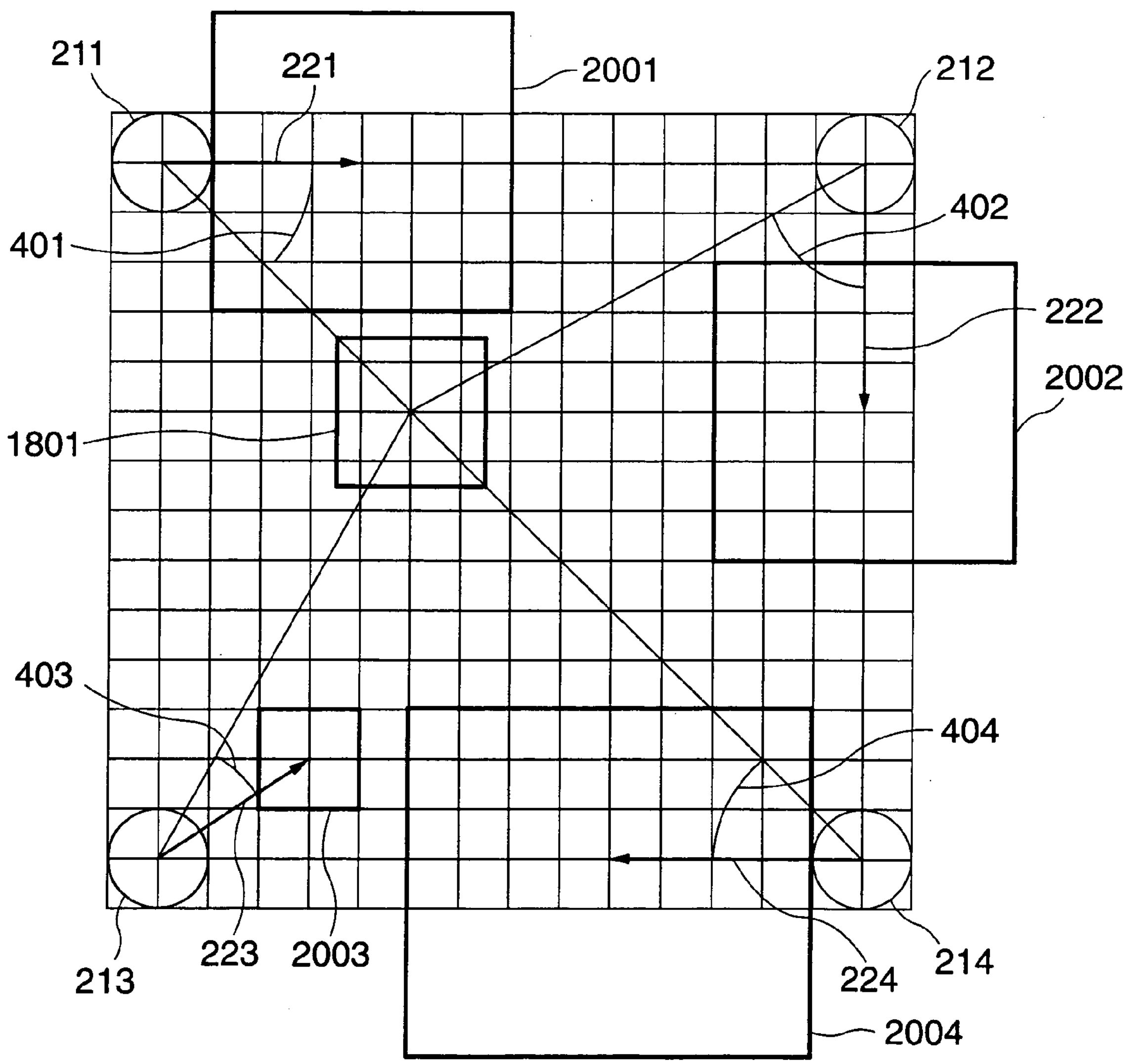
FIG. 20 is a schematic representation illustrating an example camera control region according to the fifth embodiment.

When the user specifies a desired range by way of the input device 106, the command load section 124 loads the thus-designated range. The flow of processing in which the angular-shift-time calculation section 1001 calculates the time required for the camera to pan toward the center of the designated range is identical with the process flow of the third embodiment. FIG. 20 shows an example in which the operator specifies a zoom range in the camera control region 210. In FIG. 20, reference numerals 211, 212, 213, and 214 designate camera symbols; 221, 222, 223, and 224 designate current shooting direction of cameras; 2001, 2002, 2003, and 2004 designate ranges currently shot by cameras; and 1801 designates an image display range designated by the operator. In FIG. 20, the ranges being currently shot by the cameras 101, 102, 103, and 104 are displayed in the camera control region 210. However, display of the ranges may be omitted. The ranges 2001, 2002, 2003, and 2004 currently shot by the cameras are expressed as aspects; (6×6), (6×6), (2×2), and (8×8), respectively.

There will now be described the flow of calculation of the time required for the camera to zoom in or out into the range designated by the operator. The zoom-shift time calculation section 1702 selects a camera which has not yet been subjected to calculation of the time required for the camera to zoom (step 1901). In the present example, the camera 101 is selected. The zoom-shift time calculation section 1702 receives, from the zoom range storage section 1701, the range 2001 (6×6) of the camera 101 assigned the camera symbol 211 (1902). The zoom-shift time calculation section 1702 loads the designated range 1801 (3×3) received by the command loading section 124.

The zoom-shift time calculation section 1702 accepts a load zoom range from an operator (1903) and calculates the time required for the camera to zoom in or out into the designated range from the current shooting range (1904). Provided that changing a shooting range by one unit length requires one second, the camera 101 takes three seconds to zoom into the designated range. Required focus-shift time is calculated for each camera (1905).

The current shooting range of the camera 102 assigned the camera symbol 212 is (6×6); the current shooting range of the camera 103 assigned the camera symbol 213 is (2×2); and the current shooting range of the camera 104 assigned the camera symbol 214 is (8×8). Therefore, it takes three seconds for the camera 102 to zoom into the designated range; it takes one second for the camera 103 to zoom into the designated range; and it takes five seconds for the camera 104 to zoom into the designated range.

As in the case of the third embodiment, it is assumed that panning the camera 101 toward the center of the designated range takes three seconds, panning the camera 102 toward the same takes four seconds, panning the camera 103 toward the same takes two seconds, and panning the camera 104 toward the same takes three seconds. The camera-to-be-operated determination section 125 receives the angular-shift times of 3 sec., 4 sec., 2 sec., and 3 sec. from the angular-shift-time calculation section 1001, and zoom-shift times of 3 sec., 3 sec., 1 sec., and 5 sec. from the zoom-shift time calculation section 1702. For each camera, the larger of the angular-shift time and the zoom-shift time is taken as the time required for the camera to pan toward the designated direction and zoom into the designated range.

It takes three seconds for the camera 101 to pan toward the designated direction and to zoom into the designated range; it takes four seconds for the camera 102 to pan toward the designated direction and to zoom into the designated range; it takes two seconds for the camera 103 to pan toward the designated direction and to zoom into the designated range; and it takes five seconds for the camera 104 to pan toward the designated direction and to zoom into the designated range. In the present example, the camera-to-be-operated determination section 125 determines that the camera 103 requires the least time, thus determining the camera 103 to be the camera capable of most quickly panning toward the designated direction and the zooming into the designated range.

The control command conversion section 127 receives the angle of rotation of the camera to be operated and the degree of zoom thereof. The control command conversion section 127 then delivers the rotation angle of the camera to the camera angle storage section 126 and the degree of zoom of the camera to the zoom range storage section 1701. The camera angle storage section 126 delivers the angle of the camera to the camera control region display section 123. The zoom range display section 127 displays the designated zoom range. Subsequent processing up to rotation of the cameras 101, 102, 103, and 104 is the same as that employed in the first embodiment.

As mentioned above, in the present example, in a case where the operator designates a desired range rather than a desired location, a camera optimal for shooting the designated range can be automatically selected by means of calculating the time required for a camera to pan toward a designated direction from information about the current shooting direction of the camera; calculating the time required for the camera to zoom into the designated range from information about the distance from the currently zoomed location to the designated range; and comparing the cameras in terms of the thus-calculated times, to thereby select the camera capable of most quickly panning toward the designated direction and zooming into the designated range. Thus, the present example yields a large practical effect.

Sixth Embodiment

Figure 21:
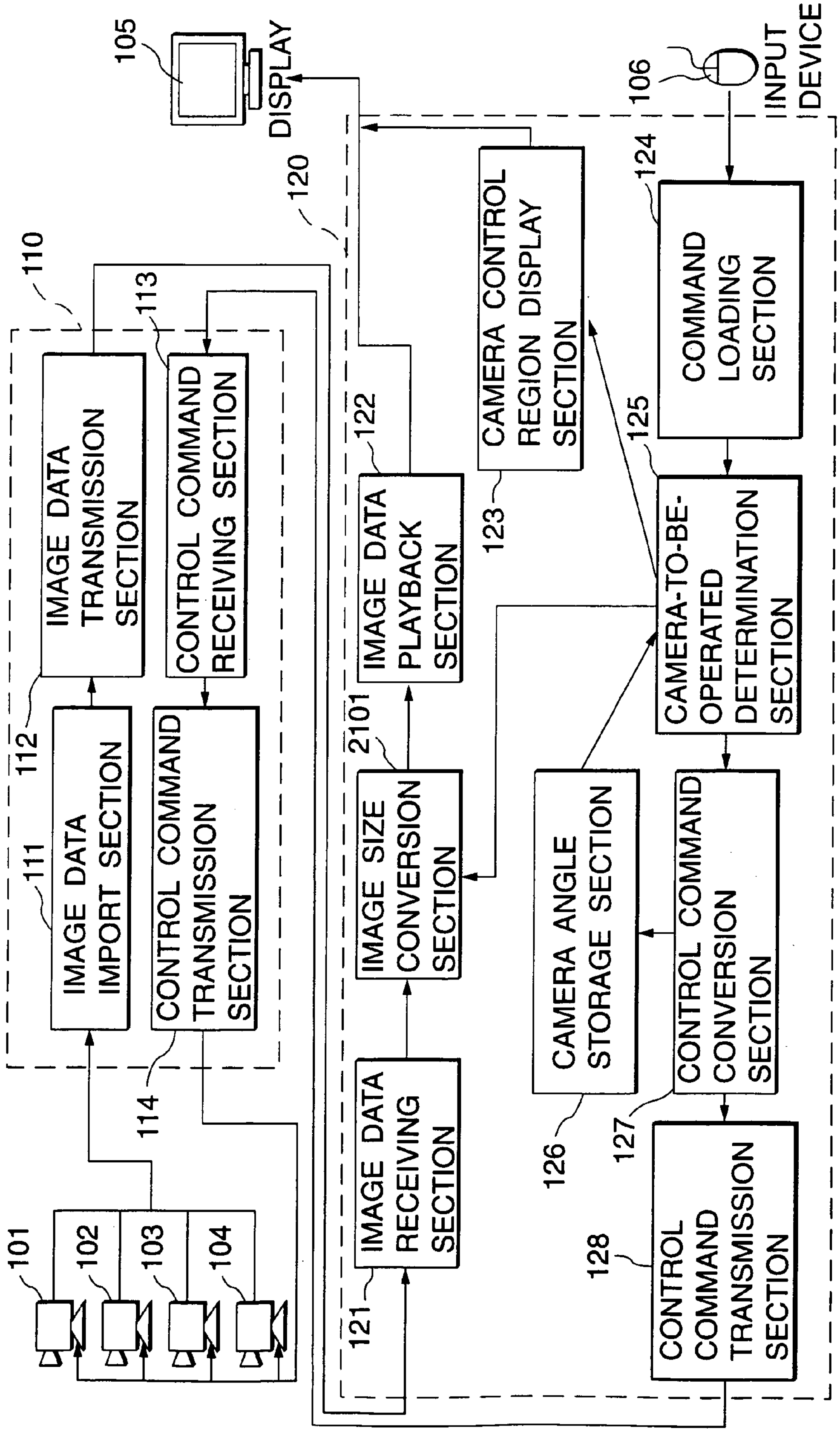
FIG. 21 is a block diagram showing the configuration of a camera control system according to sixth embodiment of the present invention.

In the sixth embodiment, an image captured by the camera which is determined by the camera-to-be-operated determination section 125 according to one of the embodiments 1 through 5 is displayed in an enlarged form by the image receiver 20. FIG. 21 shows the configuration of a system bodying the present example.

In FIG. 21, reference numerals 101, 102, 103, and 104 designate cameras; 110 designates an image receiver for receiving an image; 120 designates an image receiver for receiving an image; 105 designates a display for displaying a received image; and 106 designates an input device for controlling the cameras 101, 102, 103, and 104.

The image receiver 120 corresponds to the image receiver 120 of the first embodiment additionally provided with an image size conversion section 2101 for changing the size of an image to be displayed on the display 105. In other respects, the system of the present example is identical in configuration with that shown in FIG. 1.

Figure 22:
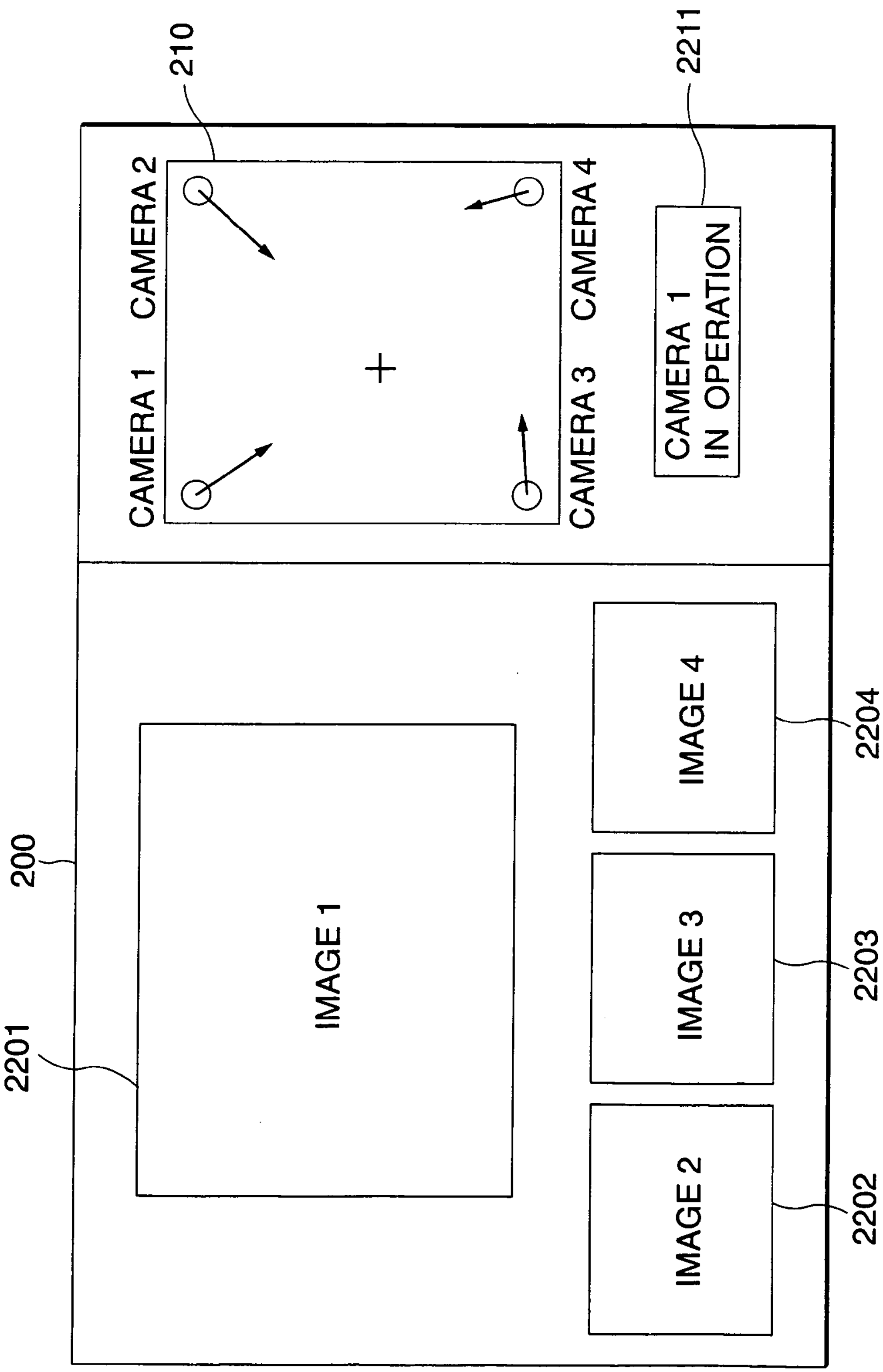
FIG. 22 is a schematic representation showing the layout of a display screen displayed on an image receiver according to the sixth embodiment.

FIG. 22 shows an example screen 200 provided with the image size conversion section 2101. The image size conversion section 2101 displays, in the image display region of the screen 200, an enlarged image 2201 captured by the camera selected by the camera-to-be-operated determination section 125. Images 2202, 2203, and 2204 captured by the other cameras are displayed in a uniformly-reduced form. The camera 211 that is currently shooting the enlarged image is displayed by the camera control region display section 123 shown in FIG. 21. However, such a function of the camera control region display section 123 may be omitted.

Figure 23:
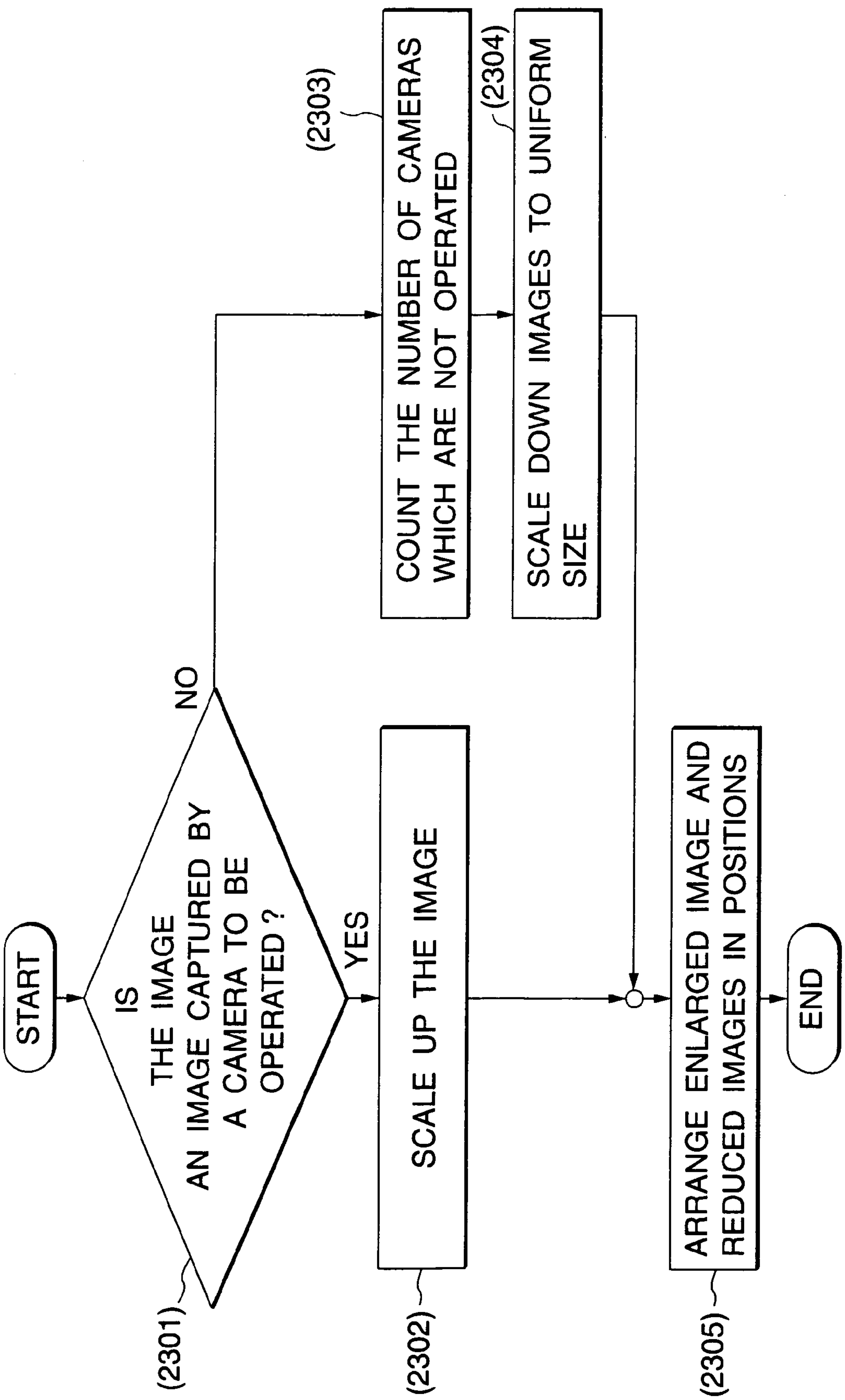
FIG. 23 shows the flow of processing for producing an enlarged image according to the sixth embodiment.

There will now be described the flow of processing in which the image transmitter 110 imports the images captured by the cameras 101, 102, 103, and 104 and the image receiver 120 plays back the thus-received images. The flow of processing in which the image data receiving section 121 receives image data is the same as that employed in the first embodiment. FIG. 23 shows the flow of processing in which the image receiver 120 displays an enlarged image of the image captured by the camera determined by the camera-to-be-operated determination section 125. The flow of processing in which the image size conversion section 2101 scales up and down image data, by reference to FIG. 23.

The image size conversion section 2101 receives image data from the image data receiving section 121. Further, the image size conversion section 2101 receives information about which camera is operated, from the camera-to-be-operated determination section 125. In the present example, the camera 101 determines a camera to be operated.

The camera-to-be-operated determination section 125 sends to the image size conversion section 2101 information indicating that the camera 101 is to be operated. The image size conversion section 2101 examines which of a plurality of images is an image captured by the camera to be operated (step 2301). In the present example, the camera 101 corresponds to the camera to be operated, and an image 2201 of the camera 101 is enlarged (step 2302). The scaling factor may be determined in advance or may be designated by the operator.

The image size conversion section 210 counts the number of cameras (step 2303) and scales down images 2202, 2203, and 2204 captured by the cameras 102, 103, and 104 which are not to be operated (step 2304). The scaling factor may be determined in advance or may be designated by the operator. The image size conversion section 2101 determines the locations of the thus-enlarged/reduced images 2201, 2202, 2203, and 2204 on the screen. The image data playback section 122 receives from the image size conversation section 2102 information about the locations at which the images are to be displayed, and the displays the images (step 2305). The display positions of the images may be determined in advance or designated by the operator.

The image data display section 122 receives reduced image data and displays, in image display areas of the display 105, an enlarged image of the image 2201 and reduced images of the images 2202, 2203, and 2204. The camera control region display section 123 displays the camera control region 210 in the same manner as employed in first embodiment. The camera control region display section 123 receives, from the camera-to-be-operated determination section 125, which camera is to be operated, and displays the name of the camera to be operated (i.e., the camera 221) is displayed in the camera control region 210.

In the present example, the image size conversion section 2101 enlarges the image of the camera finally selected by the camera-to-be-operated determination section 125 and scales down the other images to equal size. So long as the image of the finally-selected camera is displayed larger than the images of the other cameras, the scales of individual images and the display positions of the images may be set arbitrarily.

In the present example, among the images captured by a plurality of cameras, the image of the camera selected by the camera-to-be-operated determination section 125 is enlarged, and the images of the other cameras which are not to be operated are scaled down. As a result, the operator can readily ascertain the camera which is currently in an operating state and can view an enlarged image of the designated location in detail, thus yielding a large practical effect. Assuming that the present invention is applied to a monitoring system of a skyscraper which uses a plurality of monitor cameras, it is evident that the present invention provides a degree of convenience in proportion to the number of monitor cameras.

Seventh Embodiment

In the first embodiment, the camera which makes the smallest angle between the shooting direction and the imaginary line connecting the designated location and the center of the camera symbol is operated as the camera capable of panning toward the designated location most quickly. In the present example, not only the camera that is panned toward the designated location most quickly, but also one or more other cameras are simultaneously controlled in given sequence, by arranging the cameras in descending sequence of panning speed. The number of cameras to be controlled is not limited to any specific number. The configuration of a system embodying the example is shown in FIG. 24.

Figure 24:
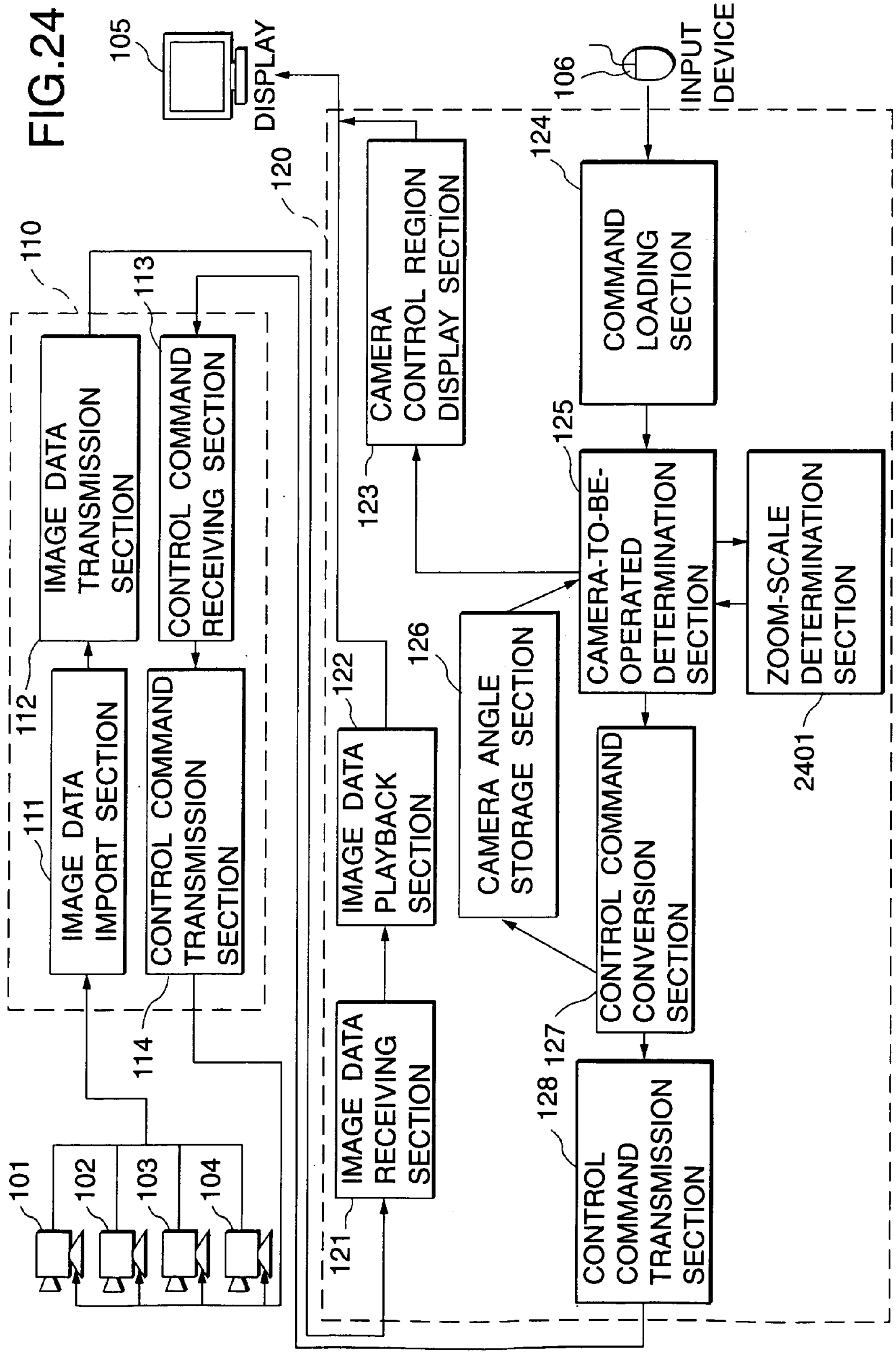
FIG. 24 is a block diagram showing the configuration of a camera control system according to seventh embodiment of the present invention.

In FIG. 24, reference numerals 101, 102, 103, and 104 designate cameras; 110 designates an image transmitter; 120 designates an image receiver; 105 designates a display; and 106 designates an input device.

The image receiver 120 of the seventh embodiment corresponds to the image receiver 120 of the first embodiment additionally provided with a zoom-scale determination section 2401 for determining the zoom scale of a camera to be operated. The camera-to-be-operated determination section 125 determines a plurality of cameras to be operated and sends the descending sequence of panning speed at which a plurality of cameras are panned toward the designated location. In other respects, the system of the present example is identical in configuration with that of the first embodiment shown in FIG. 1.

Figure 25:
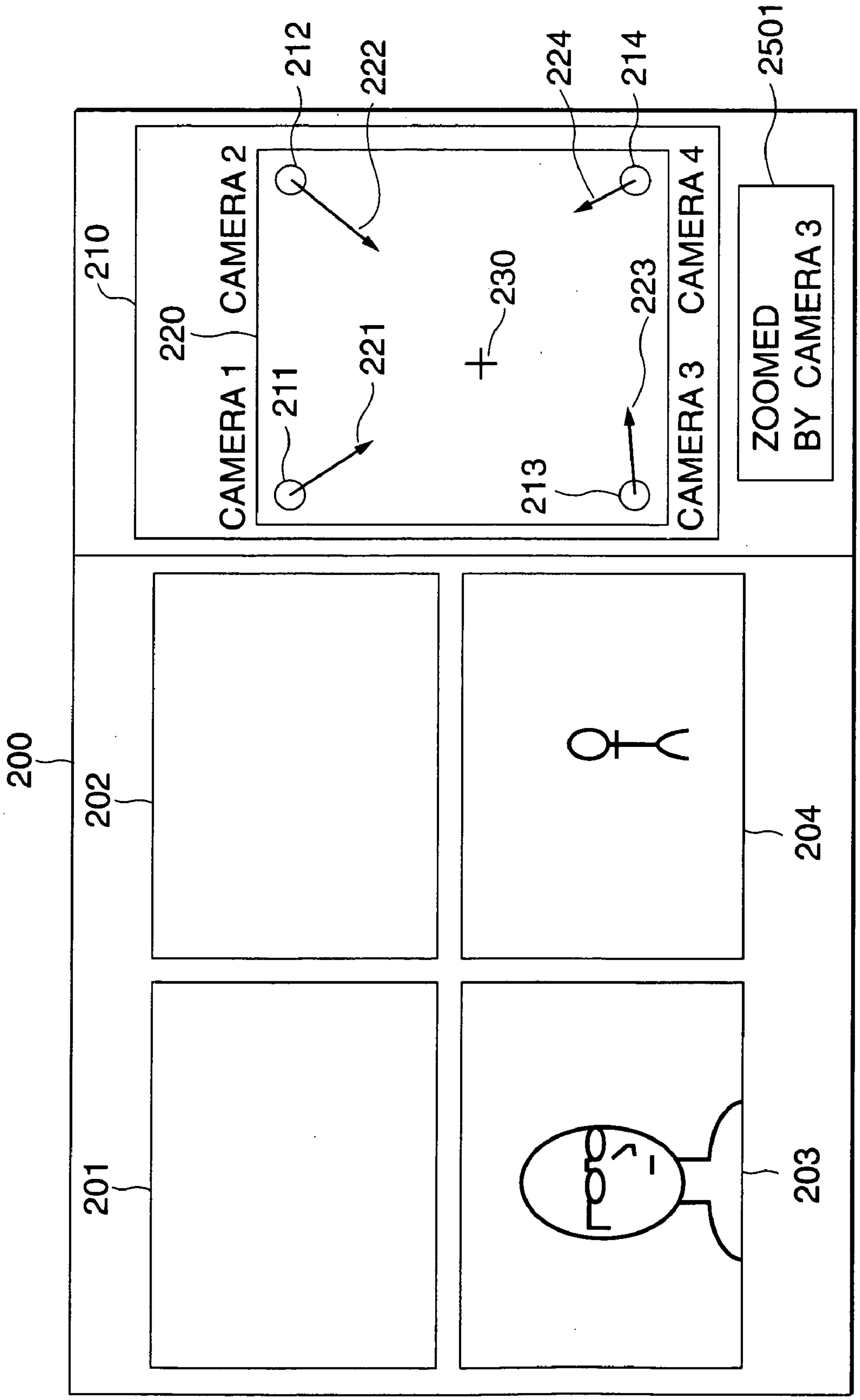
FIG. 25 is a schematic representation showing the layout of a display screen displayed on an image receiver according to the seventh embodiment.

FIG. 25 shows an example screen of processing in which cameras are arranged in descending sequence of panning speed instead of only the camera that can be panned toward the designated location most quickly, and one or more other cameras are simultaneously controlled in given sequence. An image 203 depicts a zoomed-image of the designated location (2501), and an image 204 depicts a zoomed-out image captured from the designated direction.

Figure 26:
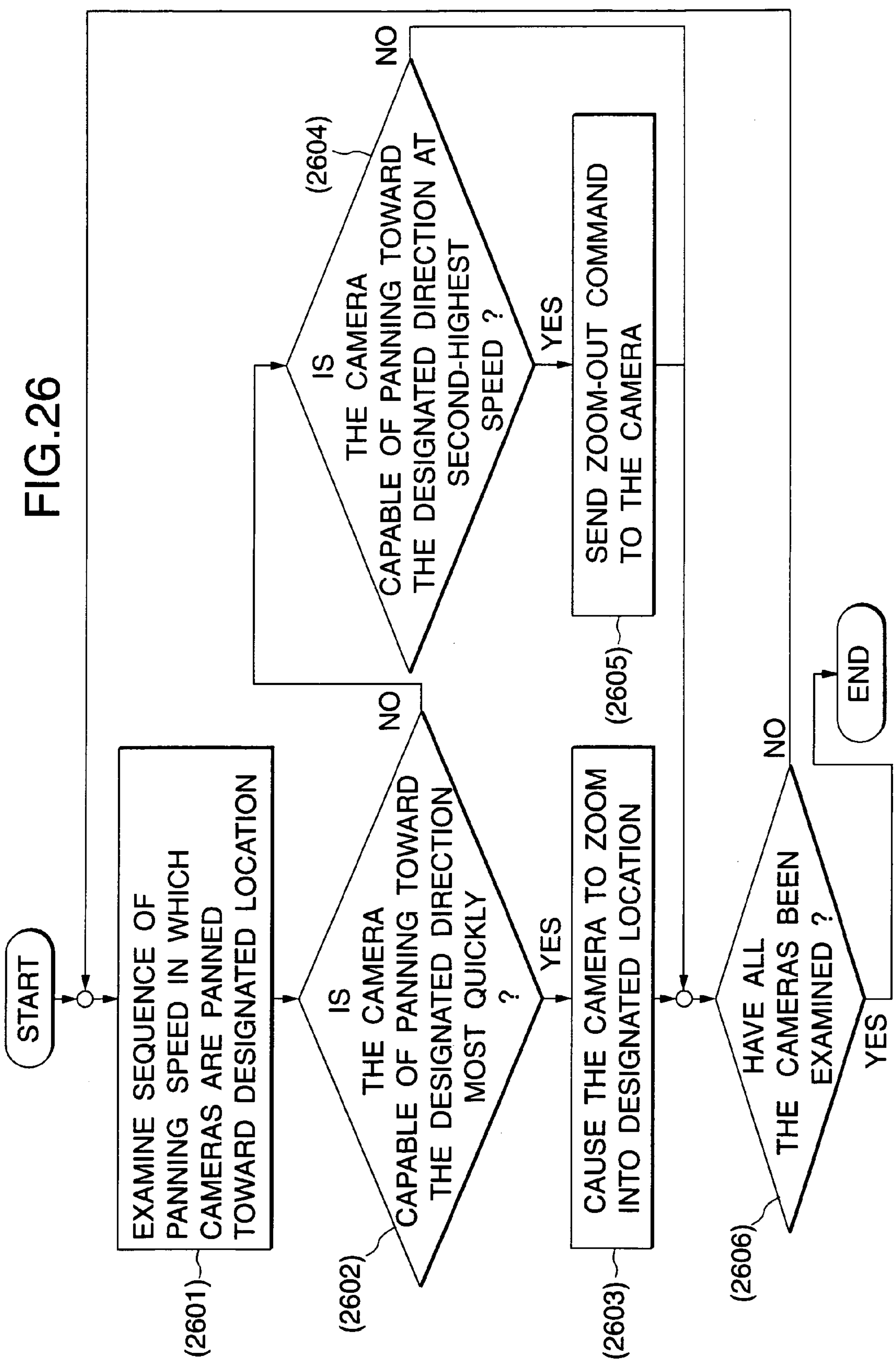
FIG. 26 shows the flow of processing for producing an enlarged image according to the seventh embodiment.
Figure 27:
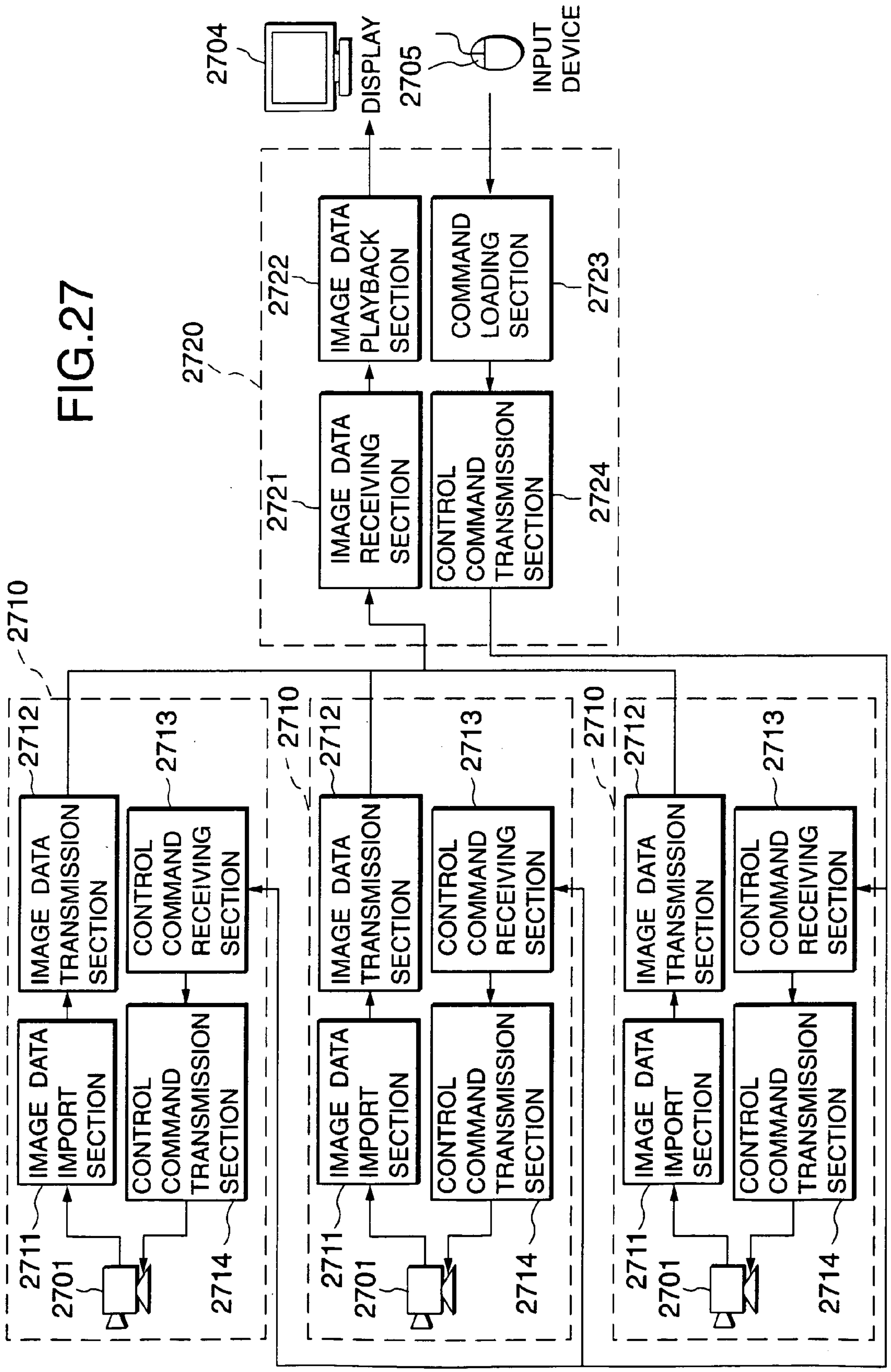
FIG. 27 is a block diagram showing the configuration of a prevailing camera control system.
Figure 28:
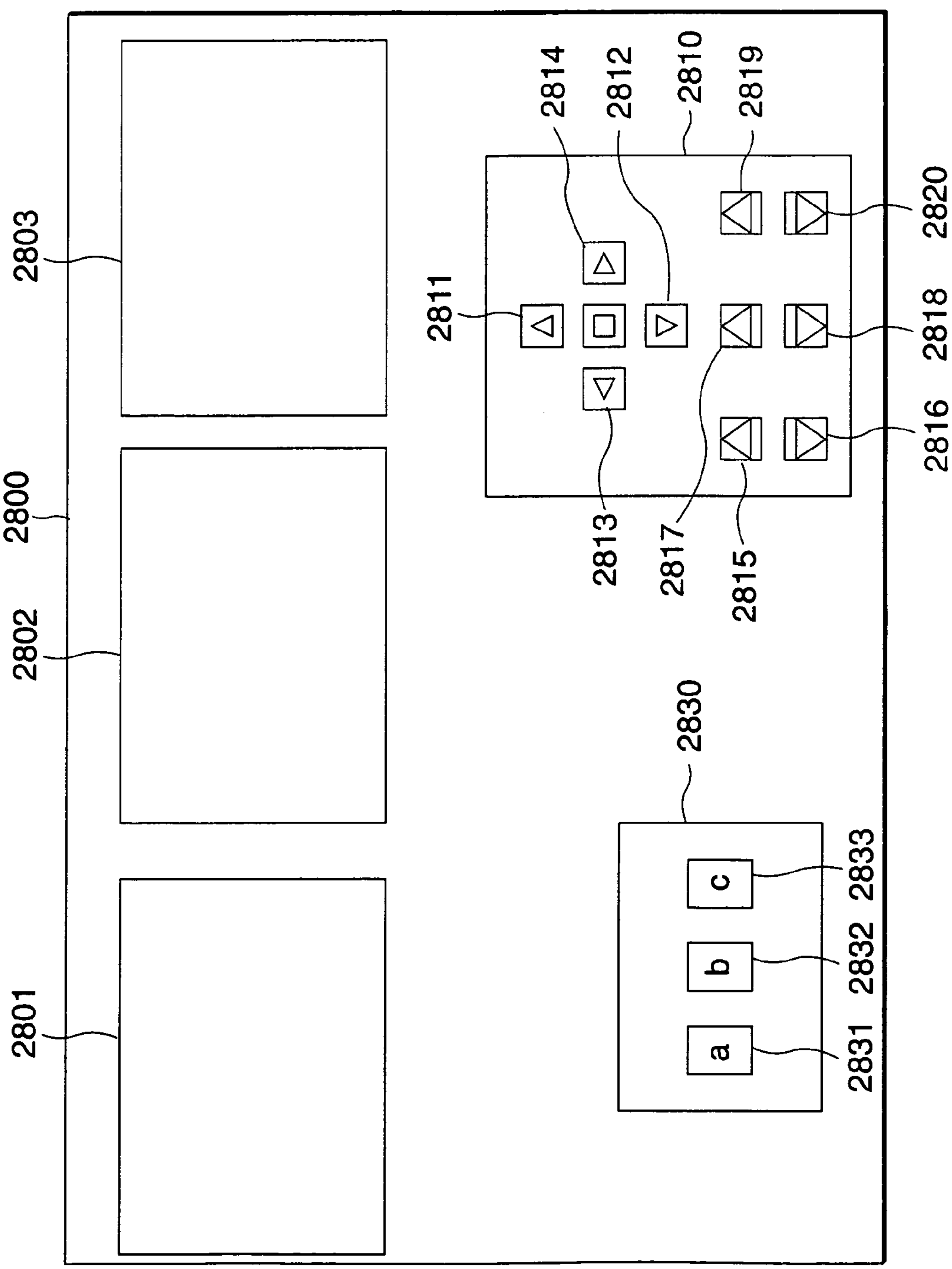
FIG. 28 is a schematic representation showing the layout of a display screen displayed on an image receiver of the prevailing camera control system.

FIG. 26 shows the flow of processing in which not only the camera that can be panned toward the designated location most quickly but also one or more other cameras are simultaneously controlled in given sequence, by arranging the cameras in descending sequence of panning speed. The present example describes a case where two cameras are controlled simultaneously, but the number of cameras to be controlled simultaneously is not limited to any specific number. The flow of processing in which the zoom-scale determination section 2401 examines cameras to be controlled, will be described by reference to FIG. 26.

When the operator specifies one location on the map 220 shown in FIG. 25, the camera-to-be-operated determination section 125 examines a sequence in which the cameras 101, 102, 103, and 104 can be panned toward the designated location (step 2601). The zoom-scale determination section 2401 receives, from the camera-to-be-operated determination section 125, the descending sequence of panning speed at which the plurality of cameras can be panned toward the designated location.

The zoom-scale determination section 2401 selects one from the plurality of cameras and examines the camera as to whether or not the camera can be panned toward the designated location most quickly (step 2602). The zoom-scale determination section 2401 instructs the camera that can be panned toward the designated location most quickly to zoom in the designated location (step 2603). The zoom-scale determination section 2401 examines one of the remaining cameras whether or not the camera can be panned toward the designated location at the second-highest speed (step 2604). If the camera can be panned toward the designated location at the second-highest speed, the zoom-scale determination section 2401 instructs the camera to zoom out so as to shoot surroundings of the designated location (step 2605). All the cameras are subjected to the foregoing examination (step 2606). In the present example, the camera 103 can be panned toward the designated location most quickly, and the camera 104 can be panned toward the designated location at the second-highest speed.

The zoom-scale determination section 2401 instructs the camera 103 to zoom in the designated location and the camera 104 to zoom out from the same. The camera-to-be-operated determination section 125 receives, from the zoom-scale determination section 2401, an instruction for causing the camera 103 to zoom in the designated location and an instruction for causing the camera 104 to zoom out from the same. The camera-to-be-operated determination section 125 determines which camera is to be operated. Under the method of determining a camera to be operated, a plurality of camera which can be panned toward the designated location are operated in descending sequence of panning speed.

The method of examining the speed at which the camera is panned is the same as that employed in the first embodiment. The camera control command conversion section 127 receives, from the camera-to-be-operated determination section 125, information about the identification of a camera to be controlled, the angle through which the camera is to be panned, and a zooming in/out scale. Subsequently, processing identical to that employed in the first embodiment is performed until the cameras 101, 102, 103, and 104 are operated.

As mentioned above, in the present embodiment, images of the desired location are captured simultaneously through use of two or more cameras. The combined use of cameras enables the operator to simultaneously obtain a detailed image of the designated location and grasp the condition of surroundings of the designated location. Thus, the present invention enables operation of a plurality of cameras through entry of a single command, thus realizing more-effective shooting of an image while involving less operation. Thus, the present invention yields a large practical effect.

As has been mentioned previously, the present invention yields the following advantages:

First, an operator can operate a camera optimal for shooting a location designated by the operator selected from among the plurality of cameras, without involvement of actual operation of UP, DOWN, RIGHT, and LEFT buttons. In contrast with a system in which a camera is operated through use of the UP, DOWN, RIGHT, and LEFT buttons, the system of the present embodiment eliminates superfluous operations, thereby yielding an advantage of shortening the time from when the operator decides to monitor a certain scene until the scene captured by the camera appears on the display.

Second, the present invention prevents a situation in which an impediment blocks the camera directed toward the designated location. Even if an impediment blocks the view field of a certain camera and hinders the camera from shooting the location designated by the operator, a system of the present invention can be set so as to avoid selection of that camera.

Third, with regard to the respective camera, there are calculated the time required for the camera to pan toward the designated location from information about the current shooting direction of a camera, as well as the time required for the camera to attain a focus on the designated location from information about the distance between the location on which the camera is currently focused and the designated location. Through comparison between the thus-calculated times, there is selected a camera capable of panning toward and attaining a focus on the designated location most quickly, thus enabling selection of a camera optimal for shooting.

Fourth, an image receiver receives a command for specifying the direction in which the designated location is to be shot, as well as the designated location. The image receiver then eliminates cameras from candidates for selection those incapable of shooting the designated location in the designated direction. Cameras capable of shooting an image of the designated location from a desired location can be automatically selected, and a camera capable of being panned most quickly to the desired direction and location can be automatically selected from among those cameras.

Fifth, when the operator designates a desired range, a camera optimal for shooting the designated range can be automatically selected by means of calculating the time required for a camera to pan toward a designated direction from information about the current shooting direction of the camera; calculating the time required for the camera to zoom into the designated range from information about the distance from the currently zoomed location to the designated range; and comparing the cameras in terms of the thus-calculated times, to thereby select the camera capable of most quickly panning toward the designated direction and zooming into the designated range.

Sixth, among the images captured by a plurality of cameras, the image of a camera to be operated is enlarged, and the images of the other cameras which are not to be operated are scaled down. As a result, the operator can efficiently ascertain, on a screen, the camera which is currently in an operating state. Further, the operator can view an enlarged image of a location designated by the operator while viewing the screen display.

Seventh, images of the desired location are captured simultaneously through use of two or more cameras. The combined use of cameras enables the operator to simultaneously obtain a detailed image of the designated location and grasp the condition of surroundings of the designated location. Thus, the present invention enables operation of a plurality of cameras through entry of a single command.

What is claimed is:

1. A camera control apparatus comprising:

an image data receiving section for receiving from an image transmitter image data captured by one of a plurality of cameras;

an image data playback section for displaying the received images on a screen;

a camera control area display section for displaying camera symbols which correspond to information representing the locations of the cameras and the directions in which the cameras are oriented as a control region for controlling the plurality of cameras connected to the image transmitter;

a command load section for loading the coordinates of a location in the control region designated by an operator;

a camera-to-be-operated determination section for determining a camera optimal for shooting the designated location from the plurality of cameras;

a control command conversion section for converting information about the coordinates loaded by the command load section into a control command signal capable of being used for controlling the plurality of cameras; and a control command transmission section for transmitting the converted control command signal to the image transmitter, wherein said camera-to-be-operated determination section determines which one of said plurality of cameras is to be panned on the basis of an angle between an imaginary line connecting the center of the camera symbol with the designated location and an imaginary line connecting the center of the camera symbol with the direction in which the camera is currently oriented.

2. The camera control apparatus as defined in claim 1, further comprising an employable camera survey section which stores information about the positions of obstructions existing in the line of sight to be shot by the plurality of cameras and which eliminates a camera undesirable for shooting the designated location from candidates considered by the camera-to-be-operated determination section.

3. The camera control apparatus as defined in claim 2, wherein, in the event of presence of an obstruction of the view between the area to be shot and one or more of the cameras in the area where the cameras are disposed, the obstruction is displayed.

4. A camera control apparatus comprising:

an image data receiving section for receiving image data captured by cameras from an image transmitter;

an image data playback section for displaying the received images on a screen;

a camera control area display section for displaying camera symbols which correspond to information representing the locations of the cameras and the directions in which the cameras are oriented as a control region for controlling the cameras connected to the image transmitter;

a command load section for loading the coordinates of a location in the control region designated by an operator;

a camera-to-be-operated determination section for determining a camera optimal for shooting the designated location;

a control command conversion section for converting information about the coordinates loaded by the command load section into a control command signal capable of being used for controlling the cameras;

a control command transmission section for transmitting the converted control command signal to the image transmitter;

an angular-shift-time calculation section for calculating the time required for the camera to pan toward the designated location;

a focus storage section for grasping the focus of a plurality of cameras; and a focus-shift-time calculation section for calculating the time required for the camera to attain a focus on the designated location, wherein the camera-to-be-operated determination section determines a camera which can shoot the designated location in the minimum time as a camera to be operated, on the basis of the time required for the camera to pan toward the designated location, as well as the time required for the camera to attain a focus on the designated location.

5. The camera control apparatus as defined in claim 4, wherein there are displayed not only the direction in which the camera is oriented but also the focusing state of the camera.

6. A camera control apparatus comprising:

an image data receiving section for receiving image data captured by cameras from an image transmitter;

an image data playback section for displaying the received images on a screen;

a camera control area display section for displaying camera symbols which correspond to information representing the locations of the cameras and the directions in which the cameras are oriented as a control region for controlling the cameras connected to the image transmitter;

a command load section for loading the coordinates of a location in the control region designated by an operator;

a camera-to-be-operated determination section for determining a camera optimal for shooting the designated location;

a control command conversion section for converting information about the coordinates loaded by the command load section into a control command signal capable of being used for controlling the cameras;

a control command transmission section for transmitting the converted control command signal to the image transmitter;

a view-point direction survey section for storing the direction in which the operator desires to shoot the designated location, wherein the camera-to-be-operated determination section determines a camera to be operated, from information as to whether or not an image can be shot in the direction designated by the view-point survey section, as well as from the angle between the current shooting direction of the camera and the direction of an imaginary line connecting the designated location with the center of the camera symbol.

7. The camera control apparatus as defined in claim 6, wherein there is displayed information about the direction in which the operator desires to shoot.

8. A camera control apparatus comprising:

an image data receiving section for receiving image data captured by cameras from an image transmitter;

an image data playback section for displaying the received images on a screen;

a camera control area display section for displaying camera symbols which correspond to information representing the locations of the cameras and the directions in which the cameras are oriented as a control region for controlling the cameras connected to the image transmitter;

a command load section for loading the coordinates of a location in the control region designated by an operator;

a camera-to-be-operated determination section for determining a camera optimal for shooting the designated location;

a control command conversion section for converting information about the coordinates loaded by the command load section into a control command signal capable of being used for controlling the cameras;

a control command transmission section for transmitting the converted control command signal to the image transmitter;

an angular-shift-time calculation section for calculating the time required for the camera to pan toward the designated location;

a zoom storage section for grasping the degree of zoom of a plurality of cameras;

a zoom-shift time calculation section for calculating the time required for a camera to zoom in order to display an image of the designated range; and a zoom range display section for displaying, in the camera control region, a range to be zoomed, wherein the camera-to-be-operated determination section determines a camera to be operated, from the time required for the camera to pan toward the designated location after the operator has designated a desired range in the control region and the time required for the camera to zoom in or out for attaining focus on the designated range.

9. The camera control apparatus as defined in claim 1, wherein an image captured by the camera selected by the camera-to-be-operated determination section is displayed greater than images captured by other cameras.

10. The camera control method as defined in claim 1, wherein, when a camera most optimal for shooting the designated location is selected, an image captured by the thus-selected camera is displayed greater than images captured by other cameras.

11. A camera control method comprising steps of:

displaying images captured by a plurality of cameras, a map relating to a location whose image is captured by the plurality of cameras, camera symbols representing the locations of the cameras in the map, and directions in which the cameras are oriented;

selecting a camera optimal for shooting a location designated by an operator; and controlling the selected camera such that the camera is panned toward the designated location, wherein, from among the plurality of cameras, there is selected a camera involving a minimum angle between the direction in which the camera is currently oriented and an imaginary line connecting the center of the camera symbol with the designated location.

12. The camera control method as defined in claim 11, wherein the camera which is blocked by an impediment and cannot shoot the designated location is eliminated from candidates for selection of a camera to be operated.

13. The camera control method as defined in claim 12, wherein, in the event of presence of an impediment in the area where the cameras are disposed, the impediment is displayed.

14. A camera control method comprising the steps of:

displaying images captured by a plurality of cameras, a map relating to a location whose image is captured by the plurality of cameras, camera symbols representing the locations, of the cameras in the map, and directions in which the cameras are oriented;

selecting a camera optimal for shooting a location designated by an operator; and controlling the selected camera such that the camera is panned toward the designated location, wherein, from among the plurality of cameras, a camera which can shoot the designated location within the minimum period of time is selected on the basis of the time required for the camera to pan toward the designated location from the direction in which the camera is currently oriented and the time required for the camera to zoom into the designated location, and the selected camera is panned toward the designated location and attains focus on the designated location.

15. The camera control method as defined in claim 14, wherein there are displayed not only the direction in which the camera is oriented but also the focusing state of the camera.

16. The camera control method as defined in claim 11, wherein cameras incapable of shooting an image from a direction desired by the operator are eliminated from candidates camera-to-be-operated.

17. The camera control method as defined in claim 16, wherein there is displayed information about the direction in which the operator desires to shoot.

18. A camera control method comprising the steps of:

displaying images captured by a plurality of cameras, a map relating to a location whose image is captured by the plurality of cameras, camera symbols representing the locations of the cameras in the map, and directions in which the cameras are oriented;

selecting a camera optimal for shooting a location designated by an operator; and controlling the selected camera such that the camera is panned toward the designated location, wherein, from among the plurality of cameras, there is selected a camera which can shoot the designated range within the minimum period of time, on the basis of the time required for the camera to pan toward a designated range from the direction in which the camera is currently oriented after the camera has received an instruction for designating a desired range from the operator, and the time required for the camera to attain focus on the designated range from the range on which the camera is currently focused, and the selected camera is panned toward the designated location, to thereby attain focus on the designated range.

* * * * *

UNITED STATES PATENT AND TRADEMARK OFFICE

CERTIFICATE OF CORRECTION

PATENT NO. : 6,954,224 B1

DATED : October 11, 2005

INVENTOR(S) : Okada et al.

It is certified that error appears in the above-identified patent and that said Letters Patent is hereby corrected as shown below:

<u>Column 31,</u>
Line 52, delete “claim 1” and insert -- claim 11 --.

Signed and Sealed this

Twenty-eighth Day of March, 2006

JON W. DUDAS

*Director of the United States Patent and Trademark Office*